US011940262B2

(12) United States Patent
Van Weeren et al.

(10) Patent No.: US 11,940,262 B2
(45) Date of Patent: Mar. 26, 2024

(54) SURVEYING INSTRUMENT FOR AND SURVEYING METHOD OF SURVEYING REFERENCE POINTS

(71) Applicant: FNV IP B.V., Leidschendam (NL)

(72) Inventors: Dennis Van Weeren, Nieuw Vennep (NL); Arnoud Marc Jongsma, Vijfhuizen (NL); Joachim Ulrich Seibert, Rijswijk (NL); Mario Josephus De Bijl, The Hague (NL)

(73) Assignee: FNV IP B.V., Leidschendam (NL)

( * ) Notice: Subject to any disclaimer, the term of this patent is extended or adjusted under 35 U.S.C. 154(b) by 175 days.

(21) Appl. No.: 16/963,767

(22) PCT Filed: Jan. 22, 2019

(86) PCT No.: PCT/NL2019/050037
§ 371 (c)(1),
(2) Date: Jul. 21, 2020

(87) PCT Pub. No.: WO2019/143250
PCT Pub. Date: Jul. 25, 2019

(65) Prior Publication Data
US 2021/0041220 A1 Feb. 11, 2021

(30) Foreign Application Priority Data

Jan. 22, 2018 (NL) ...................................... 2020304
Jun. 28, 2018 (NL) ...................................... 2021199

(51) Int. Cl.
*G01B 11/00* (2006.01)
*G01B 11/16* (2006.01)
(Continued)

(52) U.S. Cl.
CPC .......... *G01B 11/002* (2013.01); *G01B 11/161* (2013.01); *G01C 11/06* (2013.01);
(Continued)

(58) Field of Classification Search
CPC ........... G01S 5/16; G01S 1/70; G01B 11/002; G01B 11/16; G01B 11/161; G01C 11/06;
(Continued)

(56) References Cited

U.S. PATENT DOCUMENTS 6,256,057 B1 * 7/2001 Mathews ............... H04N 5/353
348/E3.018
6,324,296 B1 * 11/2001 McSheery ................. G06T 7/70
250/559.32
(Continued)

FOREIGN PATENT DOCUMENTS

EP 0717261 A2 6/1996
EP 1580523 A1 9/2005
(Continued)

OTHER PUBLICATIONS

Send et al., Foreign Application Priority Data EP 17161335.9, filed Mar. 16, 2017. (Year: 2017).*
(Continued)

*Primary Examiner* — Kathleen M Walsh
(74) *Attorney, Agent, or Firm* — Polsinelli PC

(57) ABSTRACT

A camera monitors positions on an external object having a beacon (1(*i*), i=1, 2, . . . , I; 130; 430) attached to it. The apparatus has at least one image sensor (120; 321, 322; 420; 520), an imaging optical element (101) for projecting light on the image sensor (120), and a processing unit (9). The imaging optical element (101) may be non-refractive and receives a light beam (5(*i*); 131) transmitted from the beacon (1(*i*); 130; 430) and transfers the light beam (5(*i*); 131) to the image sensor (120; 321, 322; 420; 520). The image sensor (120; 321, 322; 420; 520) forms image data based on the received light beam (5(*i*); 131) and background light. The processing unit (9) processes the image data such that it filters image data components relating to the background (Continued)

light and renders image data components relating to the light beam.

31 Claims, 16 Drawing Sheets

(51) Int. Cl.
*G01C 11/06* (2006.01)
*G06T 7/246* (2017.01)
*H04N 23/51* (2023.01)
*H04N 23/56* (2023.01)

(52) U.S. Cl.
CPC ............. *G06T 7/248* (2017.01); *H04N 23/51* (2023.01); *H04N 23/56* (2023.01)

(58) Field of Classification Search
CPC .......... G01C 15/04; G01C 3/14; G06T 7/248; H04N 5/2252; H04N 5/2256
USPC ........................................................ 348/135
See application file for complete search history.

(56) References Cited

U.S. PATENT DOCUMENTS

| | | | | |
|---|---|---|---|---|
| 7,813,529 | B1* | 10/2010 | Gershenson | G06T 7/571 |
| | | | | 382/106 |
| 9,103,671 | B1* | 8/2015 | Breed | G01S 17/931 |
| 10,121,248 | B2* | 11/2018 | Leuschner | G01C 21/203 |
| 10,236,986 | B1* | 3/2019 | Shatz | H04B 10/1121 |
| 2008/0262718 | A1* | 10/2008 | Farwell | G05D 1/0244 |
| | | | | 701/445 |
| 2009/0073425 | A1* | 3/2009 | Kling, III | G01B 11/2755 |
| | | | | 356/139.09 |
| 2010/0060962 | A1* | 3/2010 | Rosen | G03H 1/041 |
| | | | | 359/29 |
| 2011/0158637 | A1* | 6/2011 | Jung | G03B 15/03 |
| | | | | 396/535 |
| 2012/0146813 | A1 | 6/2012 | Gilmore | |
| 2013/0070258 | A1* | 3/2013 | Morbee | H05B 47/115 |
| | | | | 356/614 |
| 2013/0169805 | A1* | 7/2013 | Park | G08B 13/1963 |
| | | | | 348/143 |
| 2014/0168425 | A1* | 6/2014 | Swenson | H04N 7/18 |
| | | | | 348/143 |
| 2014/0198206 | A1 | 7/2014 | Murray | |
| 2016/0010989 | A1* | 1/2016 | Booij | H04N 7/181 |
| | | | | 348/135 |
| 2016/0214534 | A1* | 7/2016 | Richards | H04N 5/2257 |
| 2017/0146659 | A1* | 5/2017 | Kovermann | G01S 17/74 |
| 2017/0244484 | A1* | 8/2017 | Shatz | H04M 1/737 |
| 2017/0328982 | A1 | 11/2017 | Jongsma et al. | |
| 2018/0095155 | A1* | 4/2018 | Soni | G01S 19/015 |
| 2020/0011995 | A1* | 1/2020 | Send | G01S 3/783 |
| 2020/0355491 | A1* | 11/2020 | Van Weeren | G01B 11/002 |
| 2021/0223395 | A1* | 7/2021 | Valouch | G01S 3/786 |

FOREIGN PATENT DOCUMENTS

| | | |
|---|---|---|
| EP | 1983397 A2 | 10/2008 |
| EP | 2910967 A1 | 8/2015 |
| JP | 2009300324 A | 12/2009 |
| WO | 2006122747 A1 | 11/2006 |
| WO | 2008148053 A1 | 12/2008 |
| WO | 2016068715 A1 | 5/2016 |
| WO | 2019143250 A1 | 7/2019 |

OTHER PUBLICATIONS

International Search Report and Written Opinion; PCT Application No. PCT/NL2019/050037; dated Jun. 17, 2019.
Kozlova, Anna: "Motion Capture: What is it?", May 13, 2017, XP002784973, retrieved from Internet: URL:https://teslasuit.ip/blog/motion-capture-what-it-is on Sep. 20, 2018.
Park, Hyo Seon et al., "Deformation Monitoring of a Building Structure Using a Motion Capture System", IEEE, ASME Transactions of Mechatronics, vol. 20, No. 5, Oct. 1, 2015, pp. 2276-2284, XP002784974.
English abstract of JP2009300324; retrieved from www.epsacenet.com on Jul. 17, 2020.

* cited by examiner

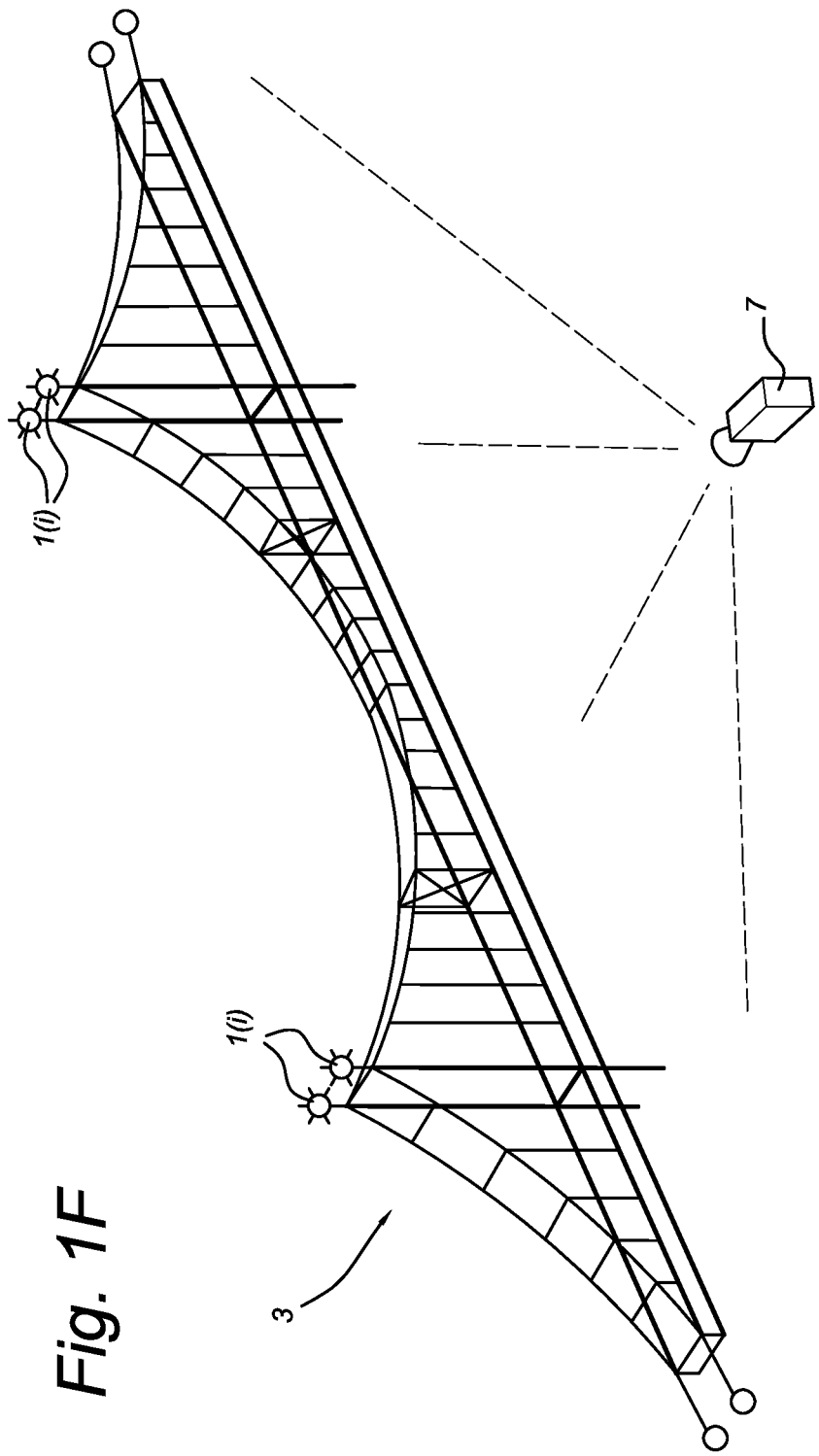

SURVEYING INSTRUMENT FOR AND SURVEYING METHOD OF SURVEYING REFERENCE POINTS

CROSS-REFERENCE TO RELATED APPLICATIONS

This application is a national stage application of International Application No. PCT/NL2019/050037, which was filed on Jan. 22, 2019, which claims priority to Netherlands Application Number 2020304 filed on Jan. 22, 2018 and Netherlands Application Number 2021199 filed on Jun. 28, 2018, of which is incorporated by reference in its entirety.

FIELD OF THE INVENTION

The present invention relates to a method of and apparatus for monitoring positions on an object. The present invention may also relate to a surveying instrument for surveying reference marker points and, optionally, relative angles between light beams received from them. Smart beacons are provided as such marker points.

BACKGROUND ART

One prior art system is described in patent document WO 2016/068715 A1 disclosing an underwater positioning system providing positioning information for a rover, moveable within a reference frame. Such a system may comprise at least one beacon having a light source located at a fixed position within the reference frame, an underwater imaging device mounted to a rover in order to observe the beacon's light source from different viewpoints for the determining of direction data representing a direction or change thereof of the beacon's light source with respect to the rover's imaging device. This known system is required to operate in a very low light or dark environment, namely on the seabed. Higher levels of ambient light could interfere with the functioning of the system.

EP 1 983 397 discloses a system and method for landmark navigation employing optical beacons deployed at locations throughout a field of operation of a vehicle. The optical beacons emit or reflect an optical signal at a predetermined blink frequency. The locations of the optical beacons may or may not be known to the vehicle. At least one imaging device on the vehicle, such as a digital camera, captures images in the field of operation, and in particular a pair of image frames such that the time interval between the image frames of the pair is equal to one-half of the blink period of the optical signal. Data is generated that represents a difference frame between two image frames captured by the imaging device. Pixel locations of optical beacons in the difference frame are identified. The position and orientation of the vehicle is determined from data representing pixel locations of optical beacons in the difference frame. The field of view of several cameras are aligned to see as many optical beacons as possible at any one moment because a better position calculation can be made when data from more optical beacons are captured in the image frames. This document is concerned with the position and orientation of the vehicle and not with the position of the beacons. The position of the beacons is assumed to be fixed. I.e., this document uses a moving camera to position a vehicle using static LED beacons. The use of a moving camera imposes limitations on the signal processing resulting in noisy measurements and the possibility of detecting "ghost" beacons (false positives). Moreover, this document has no way of identifying the attitude (pitch/roll) of the LED beacons. Document has no direct way of identifying the beacons. Identification of beacons relies on an internal database of known beacon positions.

US2008/0204699 discloses a method and a system for determining the position of a receiver unit. Modulated radiation is generated by at least one radiation projector, and a number of reference points, from among which reference points lying within a detection range of the receiver unit are detected, are projected by means of said modulated radiation. Positional data, particularly location data and/or orientation data, is derived for the receiver unit from the radiation of said reference points. This document shows signal curves as a function of time, based on the transit time measuring principle. In each case variables are plotted as a function of time. The document shows a graph showing, at the uppermost point, the ppm-accurate standard time of the receiver unit as a square-wave signal. The received signals from four reference points are shown underneath. The signals emitted as laser pulses have a pulse repetition time $TRe_p$, a time window—for example due to the use of delay lines—existing on the transmitter and receiver side for each laser. The duration of the time windows $T_{Laser1}$-$T_{Laser4}$ is identical. Based on the time zero-point to, the receiver unit receives four pulses at the times $t_1$-$t_4$, to which a transit time $t_1'$-$t_4'$ corresponds within the respective time window. These signal curves as a function of time are recorded by the receiver unit in the zero position, and the change, i.e. the change of the times t1-t4 or transit times t1'-t4', relative to this profile is evaluated continuously for position determination. Here, a corresponding distance can be coordinated with each transit time t1'-t4'. The change of the distances is correlated with a change in location of the receiver unit, so that a change in location or in orientation can be derived. Both the complete distance to the reference point or to the radiation source and only the change of the distance can be evaluated. This document calculates the position of the receiver unit relative to the reference points and starts with the assumption that the location of these reference points is fixed. Moreover, this document describes a simple time delay method to identify different beacons but that does not allow telemetry of other information.

WO2008/148053 describes a system whereby coordinates of beacons are transmitted over the light beam. However, the document does not describe a system to calculate ray angles to the beacons and is thus by nature less accurate.

JP2004325072 and JP2004325073 describe methods to compute coordinates of survey points using image data of photographs, with high accuracy. The disclosed photogrammetry is provided with a first step, a second step, and a third step. In the first step, photographing is performed by a camera from different observation points, in such a way as to include both an object to be surveyed and reference angles to be used, when survey computations on the object to be surveyed are performed to acquire at least two different images. In the second step, both angle reference points for specifying the attitude of a camera at survey points and the observation points and reference angle specifying points for specifying the reference angles, which are common to both images, are set on the object to be surveyed to compute two-dimensional coordinates of the angle reference points and the reference angle specifying points in the images. In the third step, a three-dimensional coordinate system including the object to be surveyed is set. Based on the two-dimensional coordinates of the angle reference points and of the reference angle specifying points and the reference angles, three-dimensional coordinates of the survey points are computed.

These documents refer to possible use of pin-hole cameras but do not discuss that in any further detail. They discuss issues relating to using cameras with an imaging lens and how to solve these issues. Both documents mention the optical distortion introduced by the camera with imaging lens. Both documents seek to overcome optical distortions by correcting for the distortion.

Regular refractive camera objective lenses can only compromise between chromatic and geometric aberration corrections. Therefore, a refractive camera objective lens will always show a certain amount of distortion. Furthermore, tiny imperfection within the lenses, or their surfaces, will introduce further unknown distortions. Such distortions might "migrate" over the image plane, depending on the design of the focus mechanics of the lens. Further, such distortions might be dependent on the f-stop used under certain lighting conditions.

While in principle all contributing effects can be measured for an individual objective lens, the effort and uncertainty introduced with every additional corrective measure renders the system known from JP2004325072 and JP2004325073 undesirable.

Not discussed in said documents, temperature and pressure changes to which the camera objective lenses are exposed introduce further distortions to the image. Should the camera objective lens be exposed to a heat source, e.g. sunlight, from one side, further asymmetries will be introduced by thermal effects. Thereby rendering data obtained from those known system essentially unreliable.

CN101368821 describes a measuring device for measuring the rotational angle of a triaxial air-bearing table and is characterized in that the device comprises an image acquisition and processing module arranged on the surface of the triaxial air-bearing table, an aperture arranged on the upper surface of the image acquisition and processing module, a laser transmitter group arranged above the aperture, and a measurement control system arranged at the remote end. The image acquisition and processing module comprises a camera obscura fixed on the upper surface of the triaxial air-bearing table.

U.S. Pat. No. 6,408,136 describes a portable zoom camera obscura comprising: a telescopic structure including an inner tube and an outer tube positioned concentrically and slidingly movable relative to each other. A cover with a small, centered imaging hole is attached to the imaging end of the outer tube. A diaphragm disk or ruler is mounted on the imaging end, and includes an aperture which can be positioned in a series of continuous overlapping positions with the imaging hole. The diaphragm disk or ruler also includes lenses with different focal lengths, which, when positioned in front of the imaging hole allow the camera obscura to function as a photo-camera.

DE29517080U describes the use of Fresnel zone plates for X-ray imaging.

US20080011937 discloses a solid-state imaging element or the like capable of limiting an abrupt refractive index distribution and collecting incident light at high efficiency. A concentric structure of the distributed index lens is formed of $SiO_2$ (n=1.43). This structure is a two-stage structure having film thicknesses of 1.2 and 0.8 M. The distributed index lens is constructed by cutting concentric circular recesses into $SiO_2$ and has a planar region about the center. A medium surrounding the lens is air (n=1). The concentric structure is also known as Fresnel optics.

WO2008094141 discloses an apparatus for receiving light, wherein each of the first, second and third shifted concentric ring patterns includes a Fresnel Zone Pattern or a portion of a Fresnel Zone Pattern.

WO2006125975 discloses coded aperture imaging apparatus and methods. In one aspect a coded aperture imager has at least one detector array and a reconfigurable coded aperture mask means. A reconfigurable coded aperture mask means can display various coded aperture masks to provide imaging across different fields of view and/or with different resolution without requiring any moving parts or bulky optical components. More than one detector array can be used to provide large area imaging without requiring seamless tiling. The use of coded aperture imaging for imaging through a curved optical element is taught as the image decoding can automatically remove any aberrations introduced by the curved element.

CN101614530 and CN107300827 disclose coded aperture imaging systems too.

U.S. Pat. No. 7,003,177, US2014/0354886, and M. Lindh, Development and Implementation of Star Tracker Electronics, degree project, in systems, control & robotics, second level, Stockholm, Sweden 2014, page 11, disclose super-resolution algorithms in order to achieve sub-pixel accuracy. Ioanna Tziouvara, Integration of 3D tracking systems for Interaction in Spatial Augmented Reality, Thesis, Technical University Delft, Dec. 14, 2012, discloses how to use un-sharp images. It also teaches blob detection and sub-pixel resolution.

SUMMARY OF THE INVENTION

The problem addressed by the present document is how to monitor the location of an object over time. More specifically, the addressed problem relates to monitoring objects, like buildings, which should have a fixed position relative to the earth but move over time. They may show a slowly moving height and attitude, i.e., pitch and roll, over time. Causes may relate to soft ground on which the building stands, underground construction works below the building (e.g. to build an underground parking lot or subway), and earth quakes (e.g. caused by natural gas extraction from earth locations below the building).

More specifically, it is the objective of the present invention to overcome the shortcomings of the prior art to allow sensing directional data from beacons in bright ambient light. It is a further objective of the present invention to provide a method to suppress the signal created in the image sensor, caused by spurious light from the environment.

Accordingly, the present invention provides an apparatus as defined in independent claim 1.

The invention also provides an apparatus arranged to communicate with beacons based on transmission and reception of light beams by modulating light intensity and/or wavelength of the light beams, as claimed in a further independent claim.

Moreover, the invention provides a beacon arranged to communicate with other devices based on transmission and reception of light beams by modulating light intensity and/or wavelength of the light beams, as claimed in a further independent claim.

The invention also provides a system with an apparatus as defined above, and an object, such as a building, provided with one or more beacons, as claimed in a further independent claim.

The invention also provides some methods as claimed in further independent claims.

Advantageous embodiments are claimed in the dependent claims.

According to an embodiment of the invention, an apparatus is provided in which an image sensor senses light beams from beacons and creates image data. A processing unit identifies the respective beacon based on said light beams within the image date. The identification of the respective beacons is preferably based on the respective beacon's light signature. It is a goal of the present invention to allow a processor unit to lock onto a respective beacon's light signature.

According to another embodiment of the invention, the beacons are identified by an individual modulation signal. Such a modulation can be performed in the brightness of the light beam emitted by the respective beacon. Preferably such a modulation comprises a periodic component. To identify the respective beacon, Fourier transformations or alternatively correlation and autocorrelation techniques can be used.

According to another embodiment of the invention, the beacons' light signatures can comprise a certain wavelength or change in wavelength.

According to yet another aspect of the invention, the beacons' light signature can comprise a certain combination of wavelengths, e.g. a certain combination of RGB colours, or any combination of colours available from artificial light sources. In such an embodiment, the beacons can be identified by a respective Red-Green-Blue (RGB) sensor response.

According to yet another embodiment of the present invention, the beacons' light signature can comprise light polarisation states, such as linear polarisation orientations, elliptical or circular polarisations. In such an embodiment the beacons can be identified with common polarisation analysers, while not showing any significant signature to the naked eye.

In an alternative embodiment, the light emitting part of the beacons can be formed by the end of an optical waveguide, such as optical fibres. Such embodiments allow the beacons to be very small while the light source can be remote, thereby allowing beacons to be accommodated in limited spaces.

In alternative embodiments, the invention makes use of known light signatures of warning and/or navigation lights or strobes on well-defined locations, such as lighthouses, transmission masts or towers and other tall structures. In such embodiments, depending on the type of building, the warning or navigation lights or strobes can provide a reference frame for the system.

The beacons of the present invention may be provided with an autonomous energy source, such as solar cells, wind generators, rechargeable batteries, and alike.

The controller of the beacons of the invention may be pre-programmed to emit a particular predetermined light signature.

In alternative embodiments of the invention, the beacons may be provided with a communication unit such as a light communication unit or a networking device. In such embodiments the controller of the beacons can be re-programmed. Further, a beacon can also be activated or deactivated remotely. Such embodiments allow the controlling of a beacon without the necessity of physical access to the location at which the beacon is mounted.

In a further embodiment, the beacons may be equipped with an image sensor and respective optics. This allows for beacons also acting as measurement devices. Further, in such an embodiment, the beacons can form a MESH network.

In a further aspect, it is an objective of the present invention to overcome optical distortions as occurring in commonly used surveying instruments.

In order to solve the problem posed, in said further aspect, the present invention relates to a camera comprising non-refractive optics as objective, i.e. with at least one non-refractive optical element for projecting light on said image sensor. The non-refractive optical element acts as the image forming optical element for the camera.

The non-refractive optical element can comprise a pinhole or a slit to form an image similar to a camera obscura. In a further embodiment, the non-refractive objective optical element can comprise other diffractive elements, e.g. a Fresnel zone plate or a holographic element.

Inventive aspects are claimed in independent claims whereas advantageous embodiments are claimed in dependent claims.

In a preferred embodiment the non-refractive optics comprises one or more pinholes.

There are several advantages of using a camera with a pinhole over cameras with conventional lens systems:
- pure geometric character of the optics
- no refractive chromatic aberrations
- almost infinite depth of field
- minimal thermal sensitivity due very low thermal resistance and capacity of the pinhole plate and the respective mount
- angle of view only dependent on sensor size and the pinhole-sensor distance
- very lightweight
- inexpensive
- relatively simple calibration procedure.

In further aspects of the invention, there are provided methods, systems, and apparatuses for monitoring positions on an external object using beacons and cameras to detect the positions of the beacons. In preferred embodiments, the methods systems and apparatuses for monitoring the positions of the beacons optionally but advantageously comprise cameras with non-refractive optics.

BRIEF DESCRIPTION OF THE DRAWINGS

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

Figure 1A:
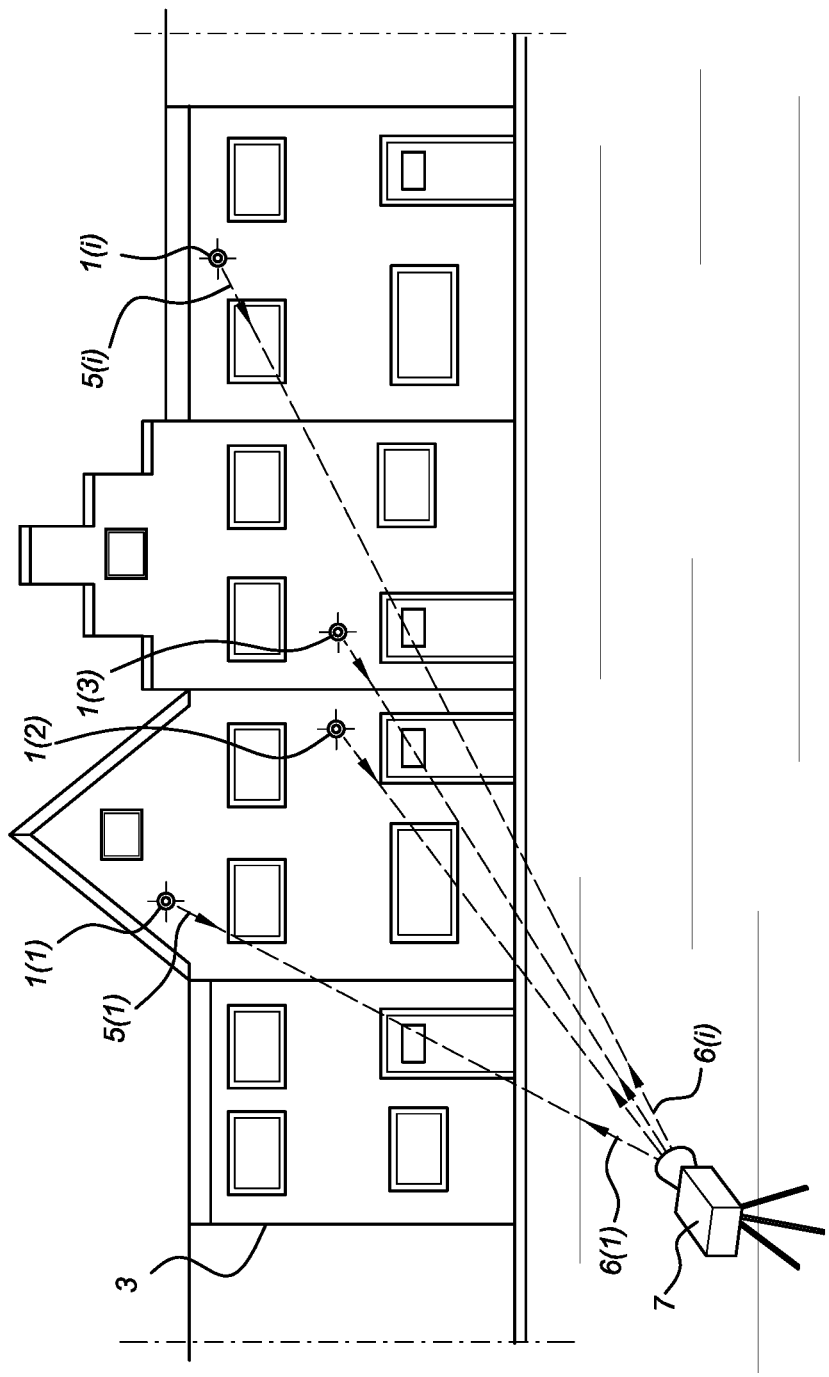

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for" "having the capacity to" "designed to" "adapted to" "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

For the purpose of determining the extent of protection conferred by the claims of this document, due account shall be taken of any element which is equivalent to an element specified in the claims.

Figure 2A:
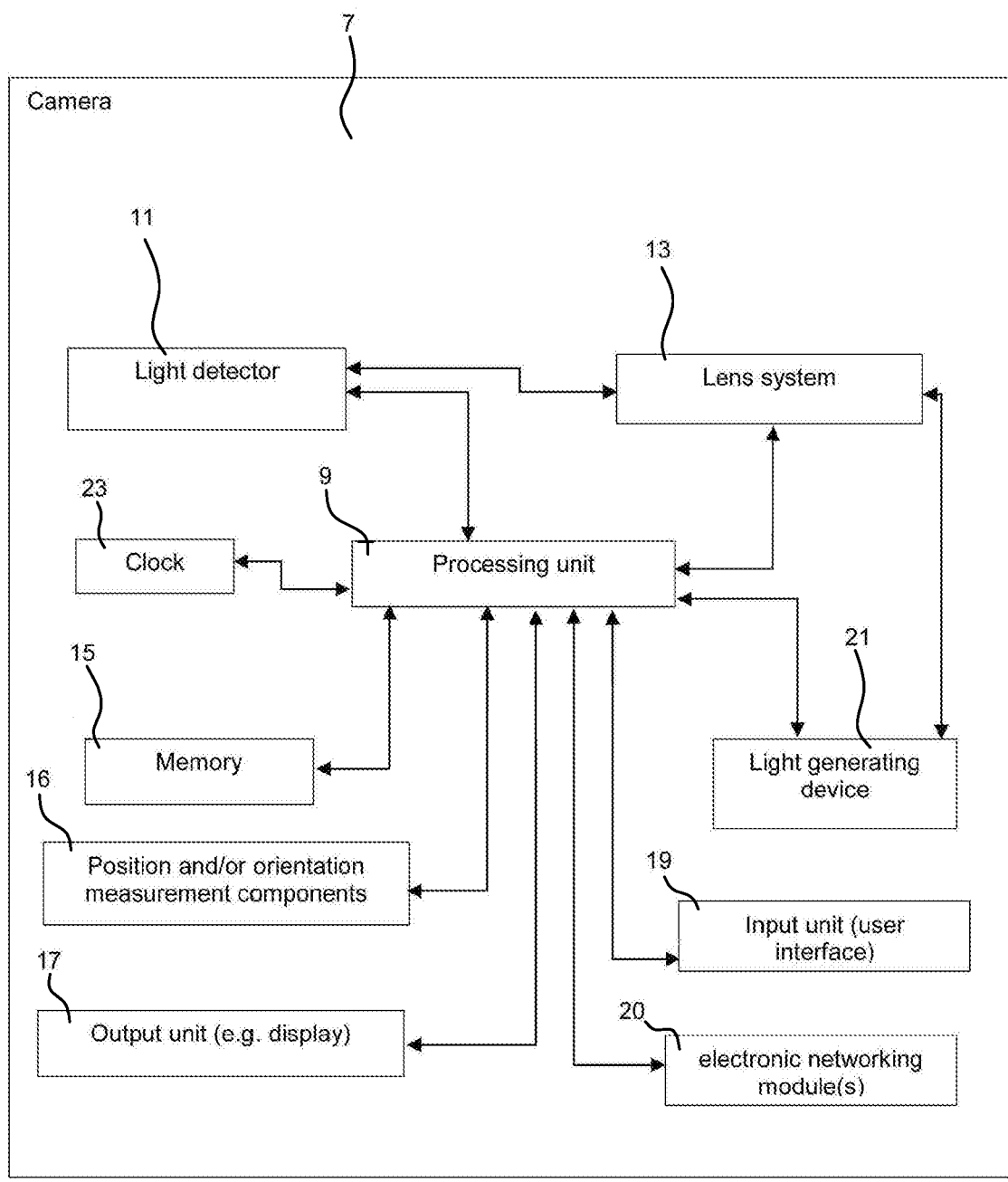
Figure 2B:
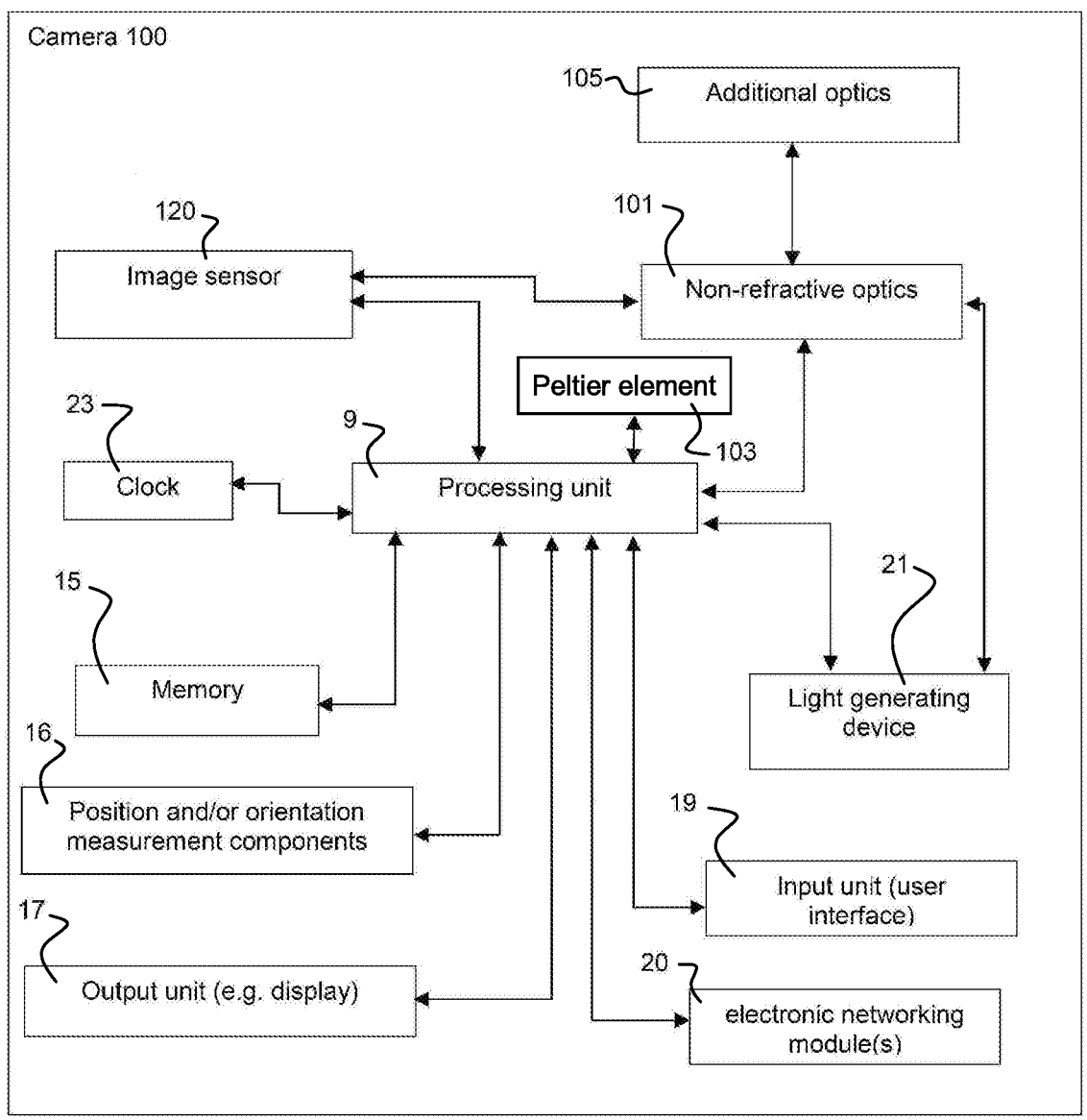
Figure 3:
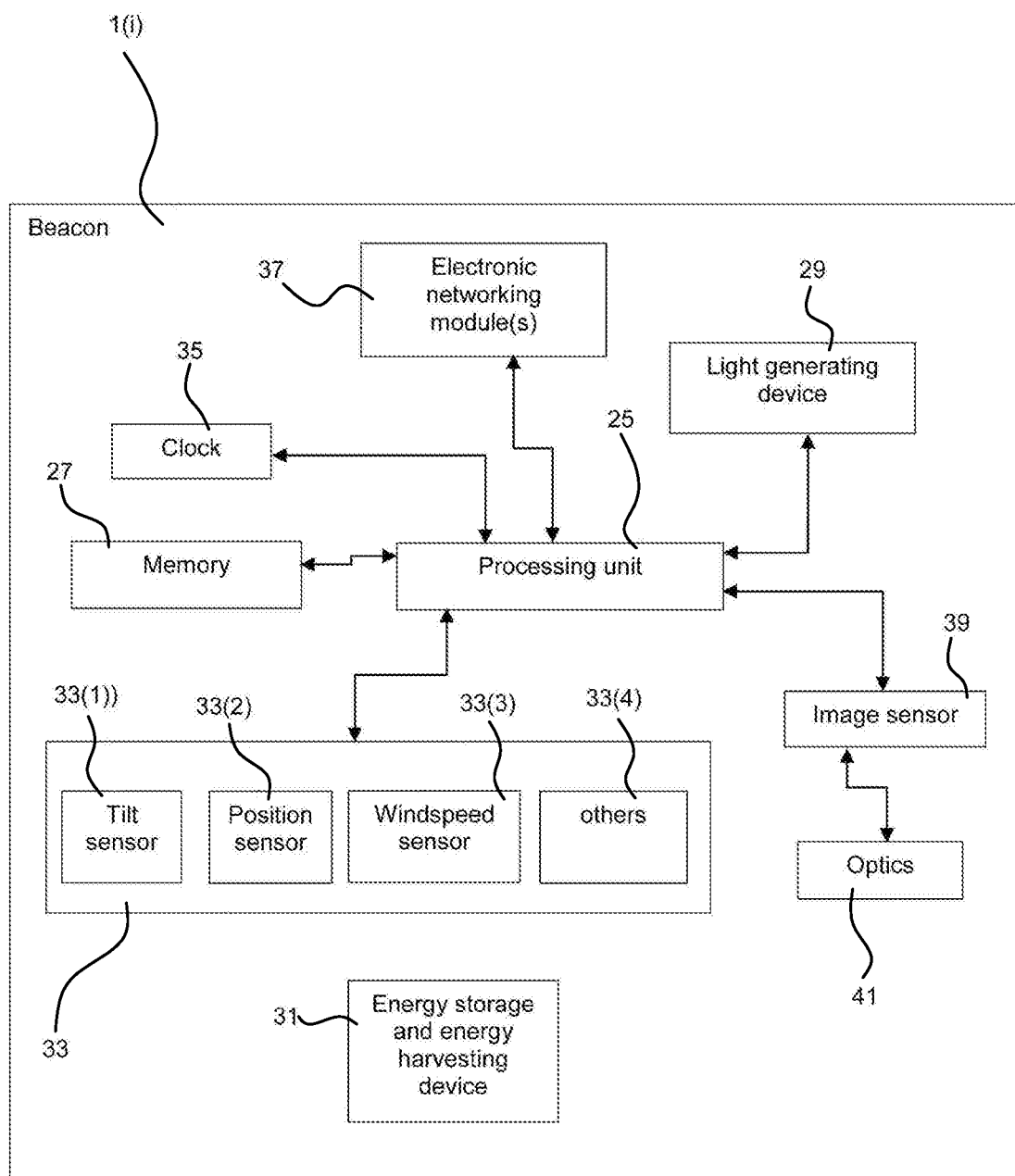
Figure 4:
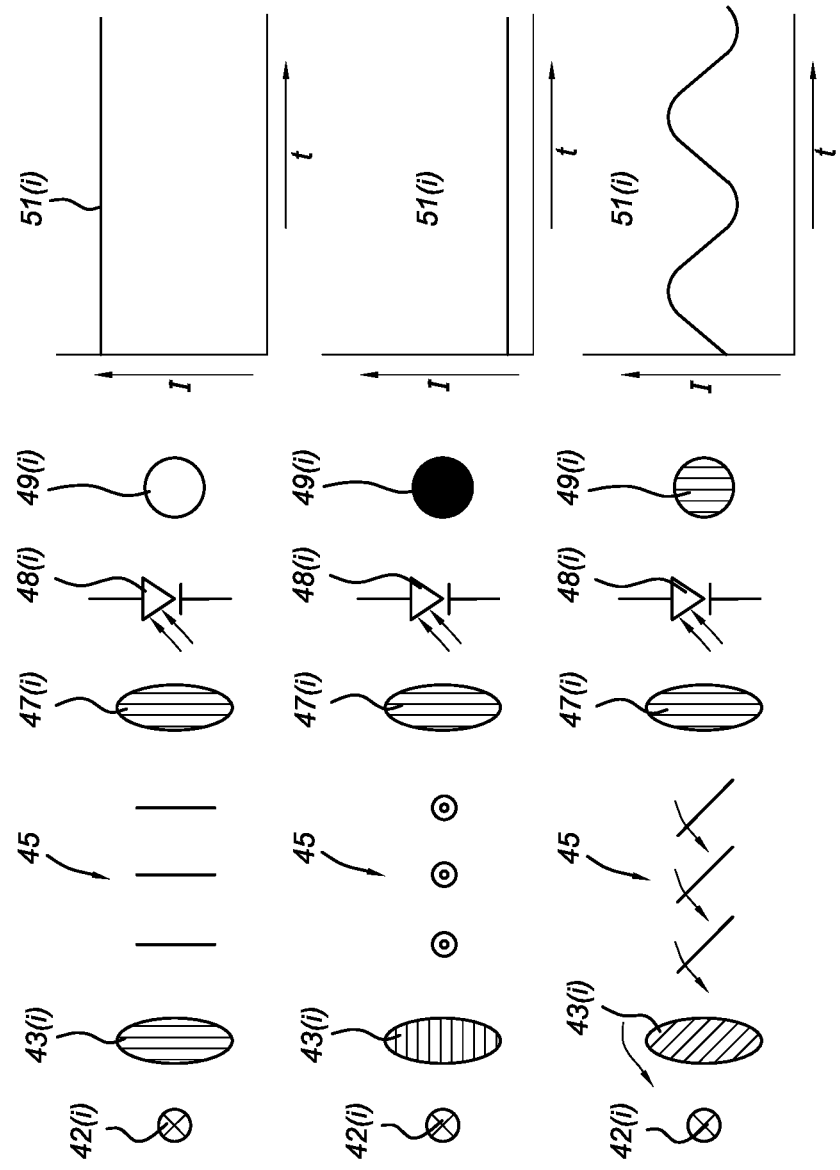
Figure 5:
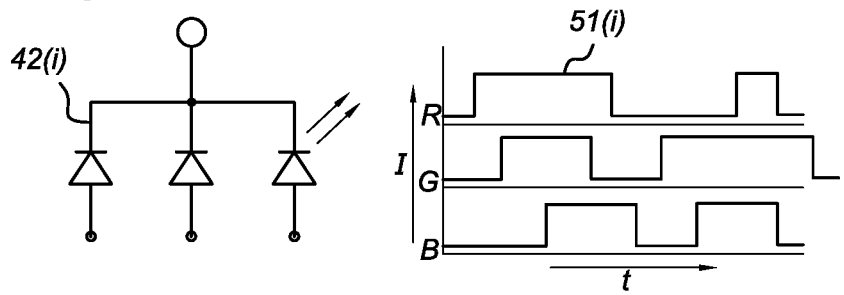
Figure 6:
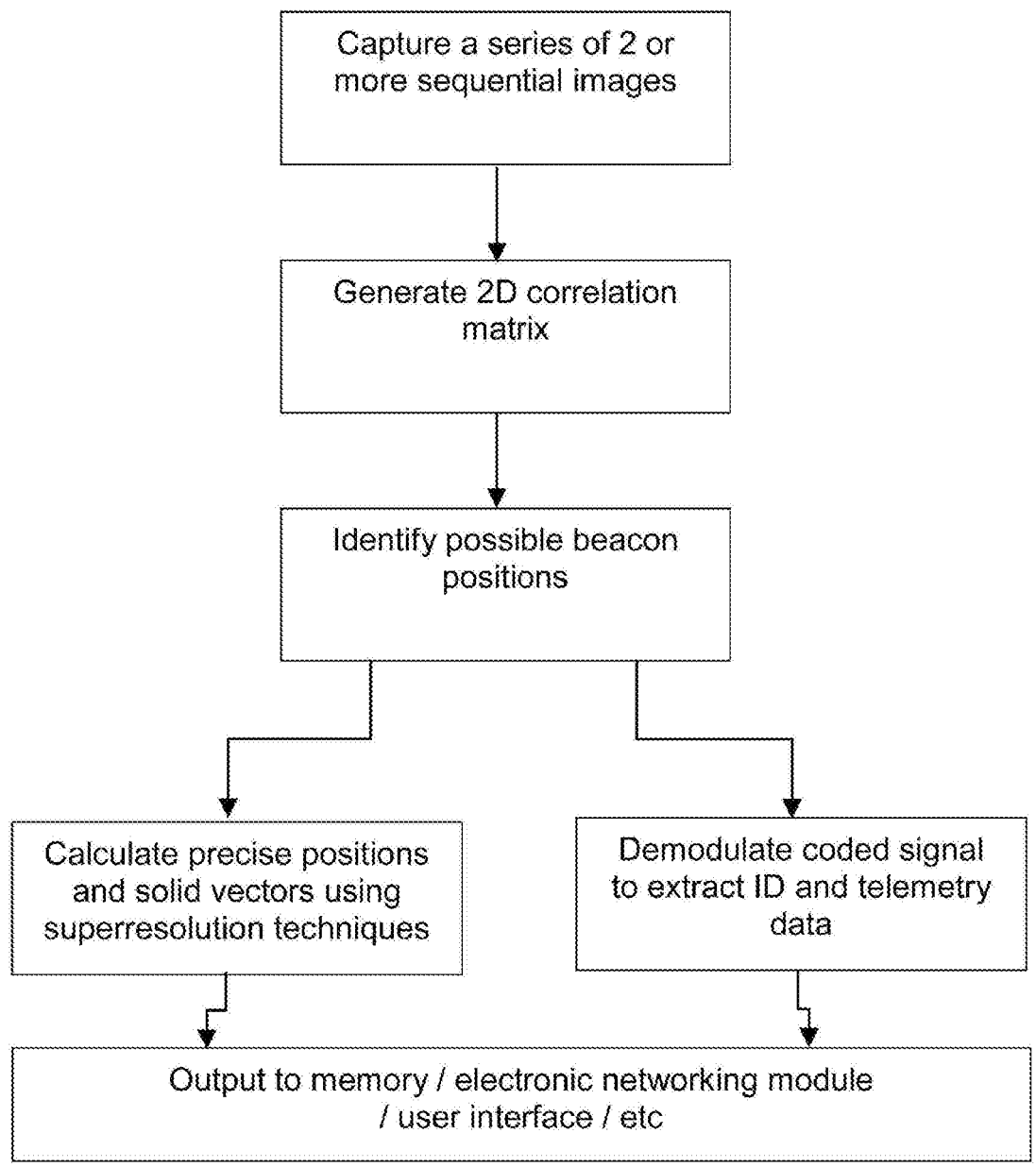

The present invention will be discussed in more detail below, with reference to the attached drawings, in which:

FIG. 1A-1G depict several schematic setups of a system for monitoring a position and/or movement of an object;

FIG. 2A and 2B depict functional overviews of a camera that can be used in the present invention;

FIG. 3 depicts a functional overview of a beacon that can be used in the present invention;

FIG. 4 shows a schematic diagram of a setup arranged to modulate light polarization;

FIG. 5 shows how color code modulation can be achieved with multi-color LEDs; and FIG. 6 shows a flow chart of an example of the functioning of the system.

FIG. 7-10A, and 11 show several examples of schematic setups of cameras with non-refractive optical elements as objective.

FIGS. 10B-10J show examples of non-refractive optical elements.

Figure 12A:
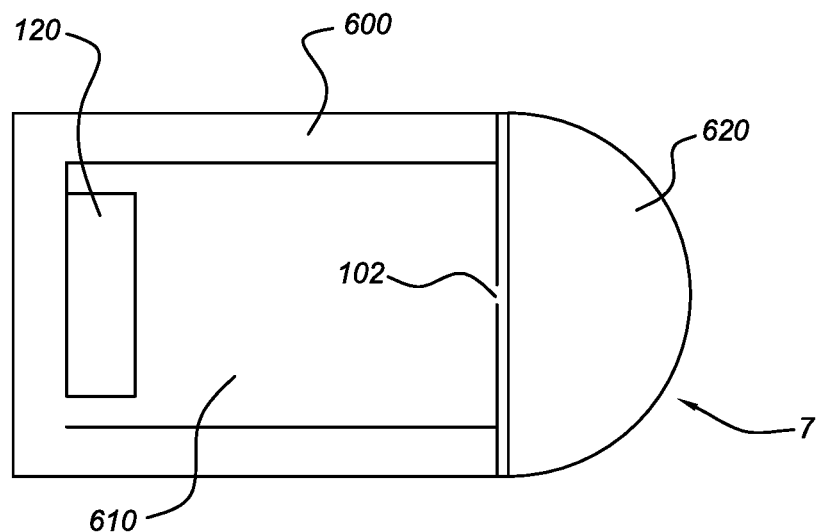
Figure 12B:
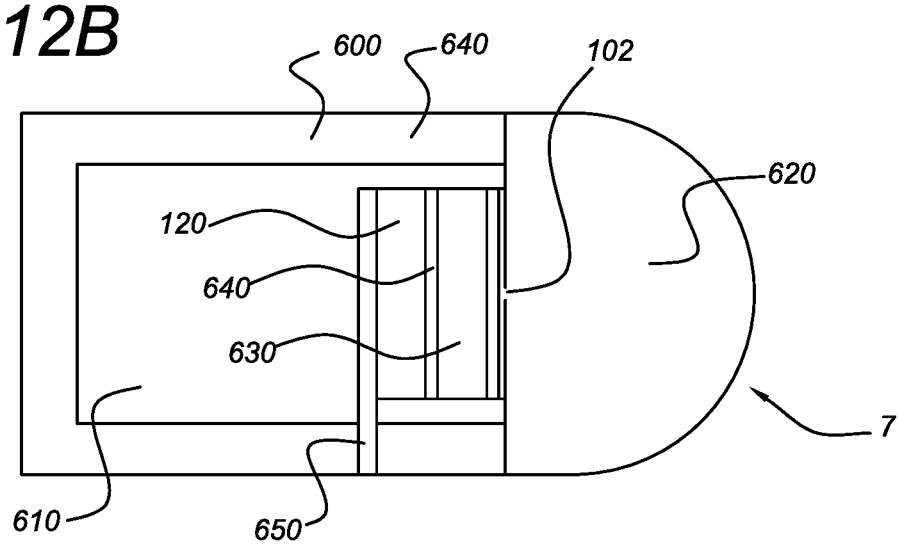

FIGS. 12A and 12B show exemplary housings for the cameras according to the present invention.

Figure 13:
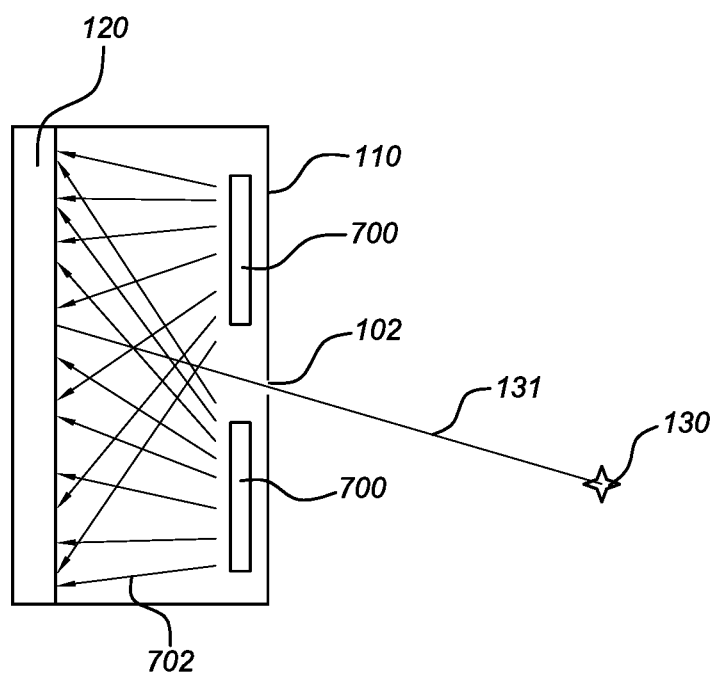

FIG. 13 shows an example of a camera with a non-refractive optical element and additional light source between the non-refractive element and the sensor.

DESCRIPTION OF EMBODIMENTS

In general, the present invention relates to surveying objects or tracking of movement of objects by tracking one or more light sources ("beacons") attached to the object. More specifically, the present invention is directed to cameras used in such surveying or tracking.

The beacons are, preferably, discerned from other light sources by using correlation techniques. For this means it is important the beacon has a predetermined light pattern. This will be explained in detail below.

FIG. 1A shows a possible setup of a system in which an object 3 is monitored. The system comprises a sensor apparatus, like a camera 7. The system also comprises one or more beacons $1(i)$, i=1, 2, 3, . . . , I, which are attached to object 3. The object 3 is shown as comprising one or more buildings to which the beacons $1(i)$ are fixed. However, the object 3 may alternatively be any other construction like a tunnel (FIGS. 1B, 1C and 1E), a tower (FIG. 1D), a bridge (FIG. 1F), but also a vehicle (like a boat on land), etc. However, object 3 may also be a natural object like a big rock.

One camera 7 is shown. However, the system may comprise more than one camera 7.

The beacons $1(i)$ are arranged to generate and transmit light beams $5(i)$ to the camera 7. The camera 7 may be arranged to generate and transmit one or more light beams $6(i)$ to the respective beacons $1(i)$.

Figure 1B:
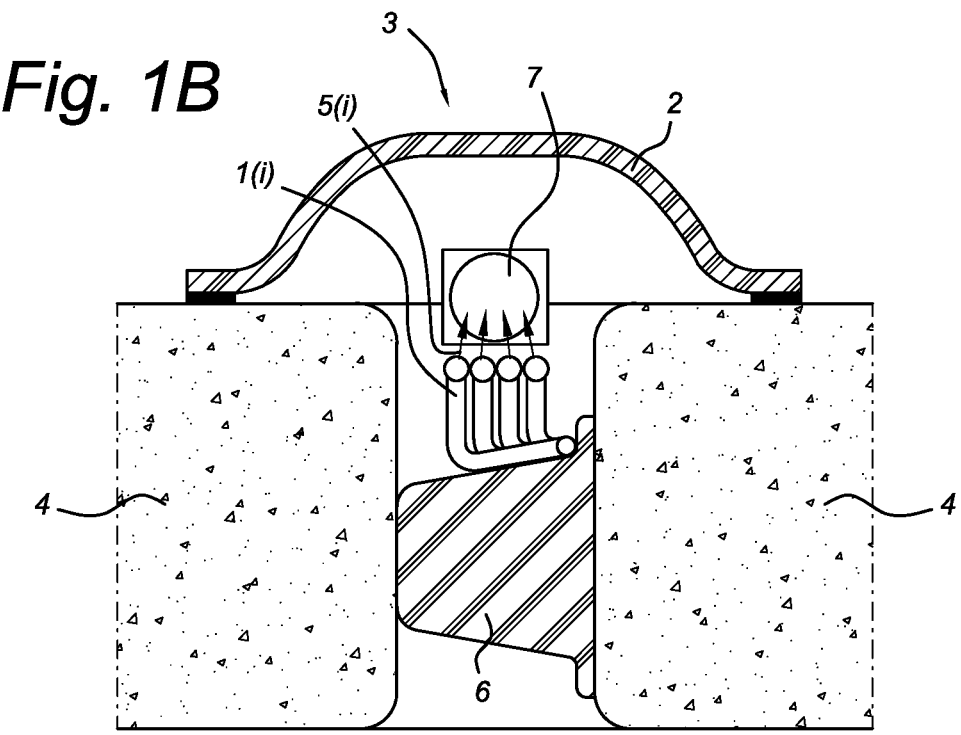
Figure 1C:
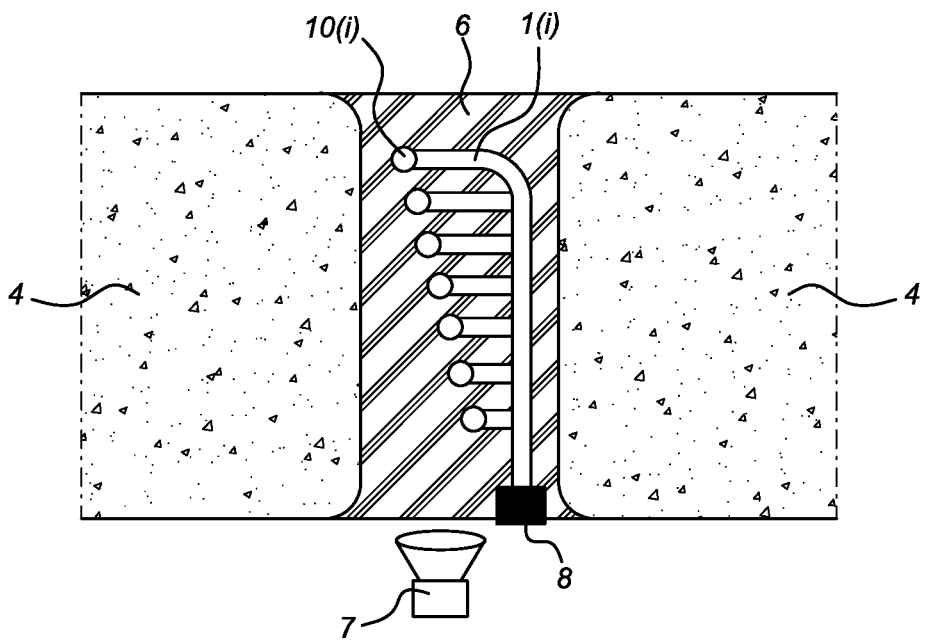

FIGS. 1B and 1C relate to a tunnel. FIG. 1C is a top view of FIG. 1B. They show two tunnel segments 4, e.g. made of concrete. These tunnel segments 4 are separated by a water sealing rubber seal 6 which is fixed to, preferably, one of the opposing tunnel segments 4. The opening between both tunnel segments 4 is, at one or both outsides, sealed with a top seal 2 attached to both tunnel segments 4. Here, the beacons $1(i)$ are implemented as a beacon box 8 coupled to several optical fibres with optical fibre end points. Each one of them is transmitting a light beam $5(i)$ towards camera 7 as controlled by beacon box 8 which is controlled by a suitable processing unit 25 (cf. FIG. 3). Alternatively, individual beacons $1(i)$ can be implemented as explained with reference of FIG. 3.

Figure 1D:
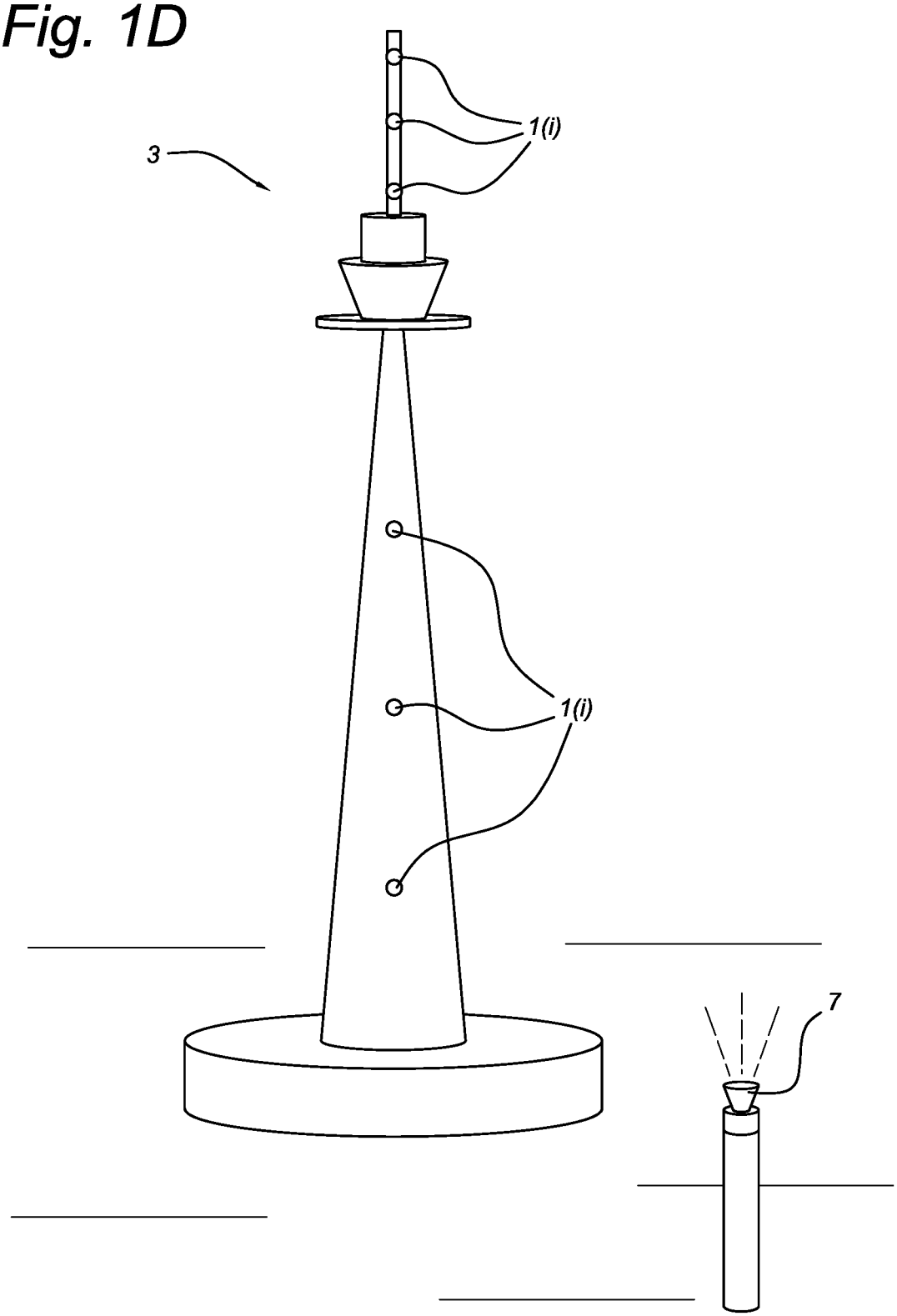

FIG. 1D shows a tower 3 having several beacons $1(i)$ attached to it. Camera 7 is arranged to view all beacons $1(i)$. The beacons may be installed in accordance with internal rules for obstacle warning strobes for e.g. airplanes.

Figure 1E:
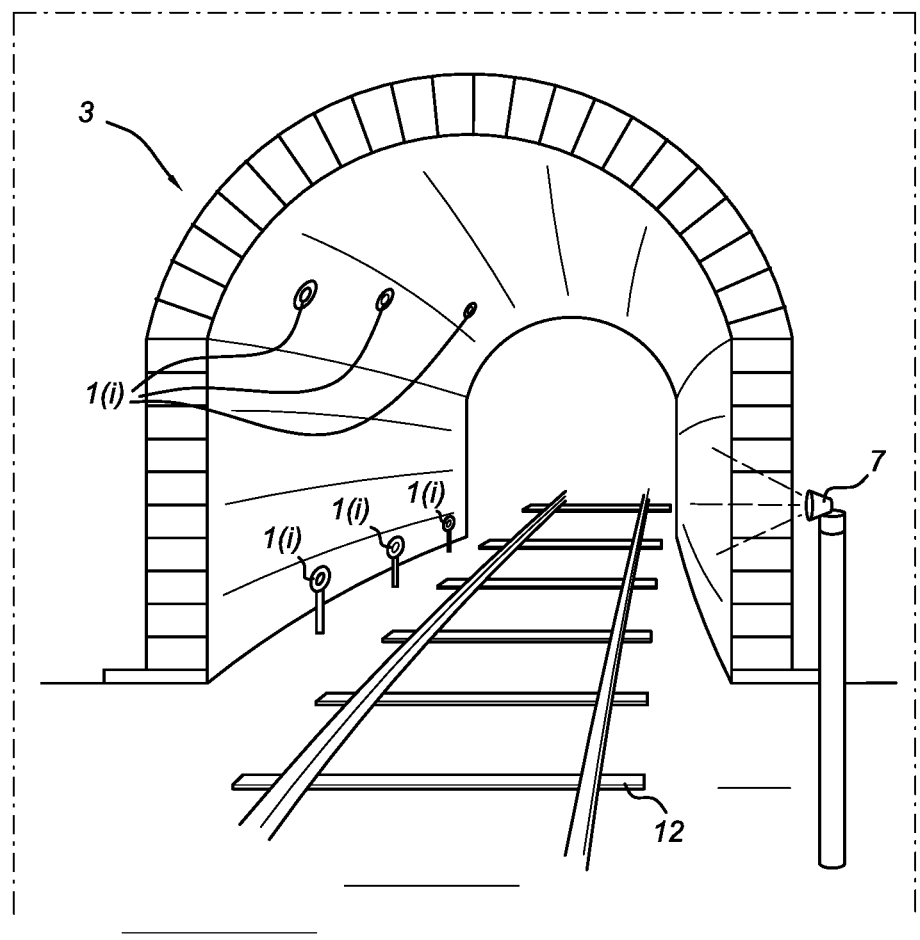

FIG. 1E show an implementation in a tunnel 3. A railway with railway sleepers 12 runs through the tunnel 3. Both the tunnel wall and the railway sleepers 12 are provided with beacons $1(i)$. Camera 7 is arranged to view all beacons $1(i)$.

FIG. 1F show an implementation on a bridge 3. The bridge 3 is provided with beacons $1(i)$. Camera 7 is arranged to view all beacons $1(i)$.

Figure 1G:
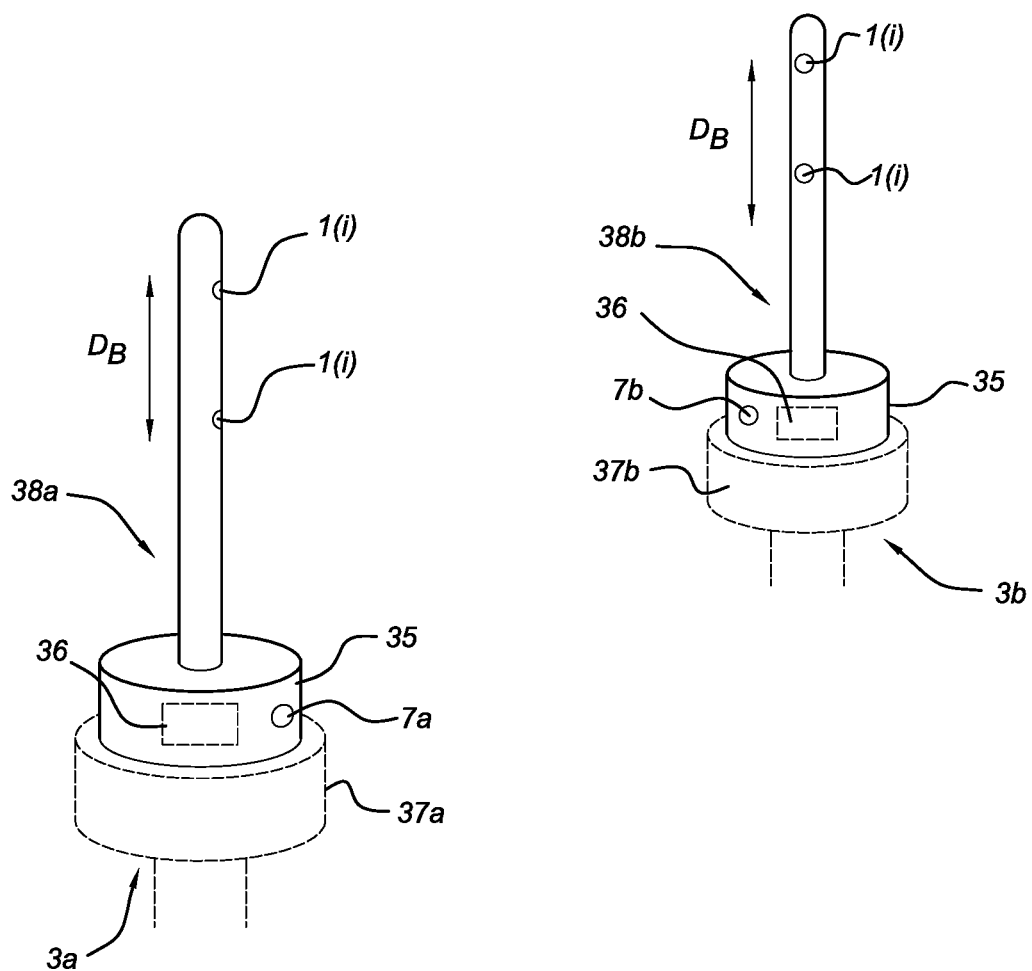

FIG. 1G shows an arrangement comprising first and second surveying arrangement $3a$, $3b$ for measuring at least one of an angle and a distance. The surveying arrangements $3a$, $3b$ each comprise a stadia rod $38a$, $38b$ each comprising first and second beacons $1(i)$ and a camera $7a$, $7b$. Each surveying arrangement $3a$, $3b$ comprises a base 35, which can be affixed to structure of interest $37a$, $37b$, e.g., a manifold or well head in a sub-sea environment. Cameras 7a, 7b are shown to be integrated into the base 35. The distance $D_B$ between the first and second beacons 1(i) on each surveying arrangement 3a, 3b is known, e.g. from calibration measurements. For example, the first and second beacons 1(i) on each surveying arrangement 3a, 3b can be spaced from one another by a distance of 1 m (although other appropriate separation distances $D_B$ can be chosen depending on the application).

In use, each camera 7a and 7b, respectively, is arranged to look at the beacons 1(i) on the other surveying arrangement 3b and 3a, respectively. A pitch and roll sensor 36 is, preferably, provided in base 35 of each surveying arrangement 3a, 3b. With the known distance $D_B$ between the first and second beacons 1(i) on each surveying arrangement 3a, 3b, the image sensor information from each camera 7a, 7b and information from the pitch and roll sensor 36, the processor can (by triangulation) calculate an absolute and relative attitude of the surveying arrangement 3a, 3b and the distance inbetween. I.e., the absolute attitude can be determined in 2D (pitch and roll), without an absolute heading (horizontal orientation). The setup can determine the relative attitude in 3 axes, which, in combination with a distance measurement, is adequate to perform a relative metrology. This is particularly advantageous in, for example, sub-sea metrology measurements for the surface construction of jumpers or spool-pieces to fit in between two flanges.

Subsea metrology is the art of determining the relative 3D attitude between two distal planes, plane P1 and plane P2, and the relative 3D position between a distinct point on plane P1 and a distinct point on plane P2.

The attitude of the planes is usually more or less horizontal (the tilt is small). Therefore, two axes of the attitude of these planes are usually measured using a two axis inclination sensor, which can be done by pitch and roll sensor 36. The coupling of such a sensor 36 with the plane however may not always be correct due to dirt or other reasons. For QC (quality control) reasons, it is therefore required to perform a sequence of four pitch and roll measurements where the sensor 36 is rotated 90 degrees in azimuth between measurements. If all these results confirm the tilt within certain tolerances, then the measurement is accepted.

It would be beneficial, though not absolutely required, to also measure the third attitude axis (relative heading), and even the relative position between the two sensors for each of the quadrants.

The proposed pinhole metrology sensor system however has an inherently limited field of view, that would not allow for the above. Therefore, in case full 6 DOF measurements are required for all four quadrants of the azimuth, it will be required to fit the system of FIG. 1G with at least four cameras 7b and four sets of beacons 1(i), preferably (but not necessarily) with overlapping fields of view, to achieve that. For instance, such cameras and sets may be located apart from one another at angular distances of 90° relative to the stadia rod 38a, 38b.

Camera

Now, the components of camera 7 will be described in more detail.

FIG. 2A shows an example of a camera 7. The example camera 7 has a processing unit 9 which is connected to a lens system 13, a light detector 11, a clock 23, a memory 15, one or more position and/or orientation measurement components 16, an output unit 17, an input unit (or user interface) 19, electronic networking module(s) 20, and a light generating device 21. The lens system 13 is shown to be connected to the light detector 11. This latter "connection" need not be a physical connection. Here, "connection" is intended to refer to a situation where the lens system 13 is arranged to receive ambient light and focus the received ambient light onto the light detector 11. The light generating device 21 is shown to be "connected" to the lens system 13 too. Again, this latter "connection" need not be a physical connection. Here, "connection" is intended to refer to a situation where the lens system 13 is arranged to receive light from the light generating device 21 and transmit such received light, preferably after suitable focussing, as one or more output light beams 6(i) to the beacons 1(i). The lens system may comprise one or more lenses. Not all functional elements shown in FIG. 2A need be present as will be apparent from the following description and claims.

All connections intended for transmission of data may be physical connections (wires) however, alternatively they may be wireless and based on transmission of electromagnetic/light radiation.

The processing unit 9 may be any suitable processing unit known from the art.

The lens system 13 is arranged such that it receives light beams 5(i) from the beacons 1(i) and focuses them on the light detector 11. It may also be arranged to receive light generated by light generating device 21 and to transmit it, possibly after focussing, towards one or more beacons 1(i). The light detector 11 preferably comprises a set of light sensitive elements (pixel) arranged in a 2D matrix forming a camera's image plane, like a CCD-sensor or a CMOS-sensor. The light detector 11 is arranged to receive the light beams 5(i) as focussed by the lens system 13. Each light beam 5(i) will be focussed on a subset of these light sensitive elements. Each such subset corresponds to a solid angle of one incoming light beam 5(i), i.e., both an angle of incidence in a horizontal and an angle of incidence in a vertical plane relative to the earth. Angles of incidence can, of course, also be measured relative to another object than the earth, like a geostationary satellite. As long as both the camera 7 and the beacons 1(i) remain at fixed positions, these subsets are static per beacon 1(i).

If the system is equipped with two or more cameras, the technology as described here can be used to measure how far the beacons 1(i) are from the cameras. This can be done by triangulation measurements where one baseline is known. Measuring a distance between camera 7 and the beacons 1(i) can also be done with other distance measuring techniques like time-of-flight measurements.

The lens system 13 can be a wide-angle lens system, a half-sky lens, a 360 degrees lens, a tele-lens or any other suitable imaging lens. The lens system 13 can optionally be provided with one of more optical filters, whereby such filters can be one of optical low-pass filter, optical band-pass filter, optical high-pass filter, polarization filter, color filter, dichroitic filter, and neutral density filter. Instead of lenses, non-refractive objectives can be used as will be explained in detail with reference to FIGS. 2B, 7-11.

The light detector 11 converts the received light beams 5(i) into an image. The image is a set of electronic signals, here called pixel signal. Each pixel signal is generated by one light sensitive element and has a value depending on the light intensity of light received by the light sensitive element. Thus, the pixel signals may also relate to the object 3 to which the beacons 1(i) are attached and its surroundings.

The light detector 11 is, preferably, positioned such that its light sensitive elements are in the vicinity of the focal plane of the lens system 13. In another preferred embodiment, the light detector 11 is positioned at a position within the focal distance of the lens system 13 such that the image is de-focused to a certain amount, resulting in a beyond infinity focus condition. In such an embodiment, the image processing may include super-resolution imaging based on defocusing techniques, thereby enabling sub-pixel resolutions. A resolution of $\frac{1}{100}$ or even better of a pixel can then be obtained.

The processing unit 9 is arranged to receive the pixel signals from the light detector 11 and store them in memory 15. The pixel signals may be stored by processing unit 9 as a single picture, preferably with a time stamp and/or position stamp indicating the position of camera 7. However, preferably, the pixel signals are stored by processing unit 9 as a series of pictures together forming a video, in which each picture is provided with a time stamp and/or position stamp indicating the position of camera 7.

Clock 23 provides clock signals to processing unit 9, as known to a person skilled in the art. The clock signals are used for the normal processing of processing unit 9 Processing unit 9 may base the time stamp on these clock signals. However, camera 7 may also be equipped with a GNSS unit receiving time signals from a satellite or may receive time signals from another suitable source.

Memory 15 may comprise different types of sub-memories, like ROM (Read Only Memory)/Flash types of memory storing suitable program instructions and data to run the processing unit 9. Also, memory will comprise suitable RAM (Random Access Memory) types of memory for storing temporary data like the data received from light detector 11. Memory 15 may also comprise cache type memory. Some or all of the sub-memories may be physically located remote from the other components. Processing unit 9 may also be arranged to send all pixel signals to a remote unit via electronic networking module(s) 20 for external storage and processing. A local copy of these pixel signals may then, but need not be, stored in a local memory 15 within camera 7.

Memory 15 stores initial position data indicating the initial position of camera 7. Such initial position data may have been established by using a theodolite and then be stored by a user. Such initial position data can also result from a measurement made by the camera 7 itself. E.g., the camera 7 can collect consecutive pictures from known "blinking" light sources installed on tall air traffic obstacle markers having well known locations. Such obstacle markers may be placed in defined vertical distances on tall structures and thereby allow for triangulation (cf. FIG. 1c). Memory 15 also stores a camera ID identifying camera 7 and being used by processing unit 9 in external communications with other devices to identify itself to those other external devices.

Position and/or orientation measurement components 16 may include one or more accelerometers and/or gyrometers/gyroscopes, as is known to a person skilled in the art. They may also include the above mentioned GNSS unit. Such accelerometers and/or gyrometers/gyroscopes measure the camera's own motion and derive an updated camera position and orientation from such measurements. The updated camera position and/or orientation is then stored by processing unit 9 in memory 15. By doing so, changing camera positions and/or orientations can be taken into account when measuring the position of the one or more beacons 1(i). Accuracy may be in the order of a few $\frac{1}{1000}$ degrees. Tests have shown 2 milli degrees peak-to-peak. Moreover, a three-axis accelerometer package can also measure the direction of earth gravity when static. A 3D gyro package of sufficient performance can measure the direction of the earth rotation axis (also when static).

Output unit 17 may comprises one or more sub-output-units, like a display and a speaker.

Input unit 19 may comprise one or more sub-input-units like a keyboard and a microphone. The display and keyboard may be made as two distinct touch screens. However, they may also be implemented as a single touch screen.

Electronic networking modules 20 may comprise one or more of LTE (Long Term Evolution), Ethernet, WiFi, Bluetooth, Powerline communication, Low Power Wide Area Network (e.g. Lora™ and Sigfox™), and NFC (Near Field Communication) modules. Technology known from the IoT (Internet of Things) may be used, as well as any proprietary communication protocol.

The light generating device 21 comprises at least one light source like a Light Emitting Diode (LED) source configured to generate light. Processing unit 9 is arranged to control each LED source such that they generate a light beam. The LED sources transmit them to lens system 13 which transforms them to become light beams 6(i). Alternatively, the light generating device 21 comprises at least one of VCSELs (Vertical-Cavity Surface-Emitting Laser), EELs (Edge Emitting Laser), incandescent light bulb, fluorescent light sources, quantum dots, and light converting elements.

The light emitting power and size of the beacons 1(i) can be adapted to the circumstances and environment. Should the system be employed in confined environments, such as tunnels, cavities, crevasses, crevices maintenance shafts, etc., the beacons 1(i) may be small such as to accommodate as little space as possible.

Whereas FIG. 2A shows a camera 7 with refractive optics (lens system) 13, in a further embodiment the camera comprises non-refractive optics. Such a camera may be used both to detect a location of an object and/or to detect whether an object's location is moving.

FIG. 2B shows such a camera 100 with non-refractive optics in a schematic setup. Such a camera 100 can be used in the same way as camera 7. The same reference numbers as in FIG. 2A refer to the same components. Camera 100 comprises non-refractive optics 101 and an image sensor 120. Image sensor 120 preferably comprises a set of light sensitive elements (pixels) arranged in a 2D matrix forming a camera's image plane, like a CCD-sensor or a CMOS-sensor. Optionally, additional optics 105 and/or a thermostat 103 may also be provided as will become clearer from the description hereinafter.

In an alternative embodiment a line sensor can be used in combination with an optical slit as objective, rather than a pinhole. The optical slit, in such an embodiment, is oriented essentially perpendicular to the line sensor's lateral direction. Such alternative embodiments can provide measurements of angles in one dimension. In order to increase the number of dimensions available to be measured, two or more of such devices equipped with line sensors can be arranged in various different orientations. For example, two of such devices can be arranged in a perpendicular fashion, thereby allowing for measurements, similar to measurements performed with a 2D matrix sensor. Such linear sensor arrangements would have the advantage of consuming substantially less power than a device employing a 2D matrix sensor.

Example: Non-Refractive Optics

FIGS. 7-10A, 11 and 12 show schematic setups of camera 100 of FIG. 2B with non-refractive optics. Only the non-refractive optics and the image sensor are schematically shown. For sake of clarity, the other components indicated with reference numbers 9, 15, 16, 17, 19, 20, 21, 23 in FIG.

2B have not been shown. FIGS. 10B-10J show examples of non-refractive optical elements.

Figure 7:
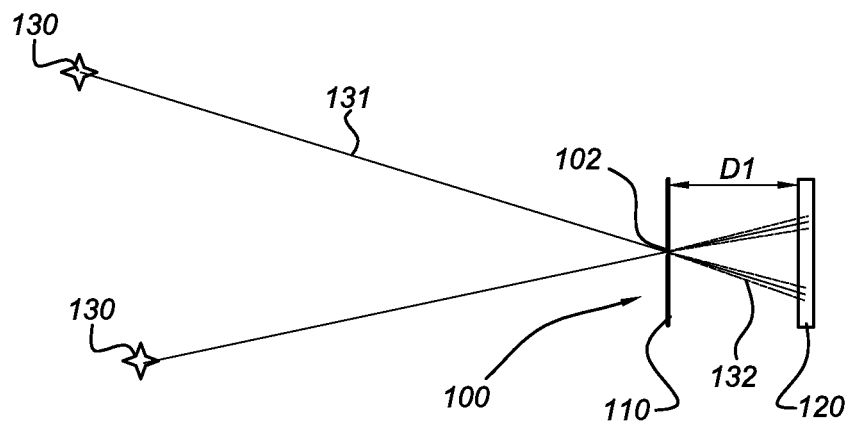

FIG. 7 shows a schematic setup of a camera 100 with a pinhole objective 102 in a front surface 110. An image sensor 120 is located at a predetermined distance D1 (or focal length) from pinhole 102. The camera 100 is arranged such that it receives light beams 131 from one or more (smart) beacons 130. The light beams 131 impinge on the pinhole 102 to form an image on the sensor 120. The light beams 131 are diffracted by pinhole 102 to form a diffracted light pattern on image sensor 120. The diffraction is indicated with some additional lines 132. The diffracted pattern forms an Airy pattern on image sensor 120.

An Airy pattern is a diffraction pattern with a bright region (Airy disc) in the center together with a series of concentric rings of decreasing intensity around it. The diameter of this pattern is related to the wavelength (λ) of the illuminating light and the size of the pinhole.

The Airy disc, or minimum spot size on the image sensor 120, can be calculated using the f/# and wavelength in μm:

Minimum spot size(Airy disc diameter)(μm)=2.44*λ (μm)*f/#

Where f=focal length
=diameter of aperture

In all embodiments shown in FIGS. 7-11, such a diffraction is present. However, for clarity reasons it is only schematically shown in FIG. 7.

Figure 8A:
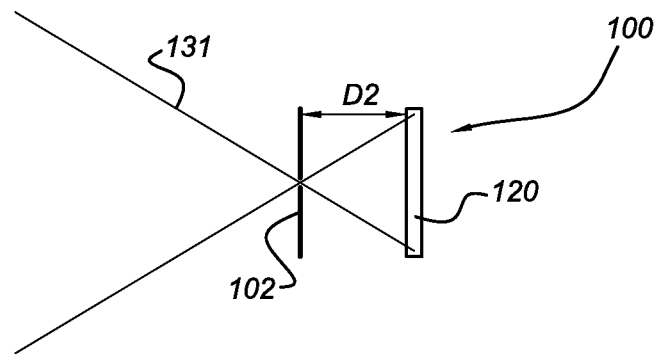
Figure 8B:
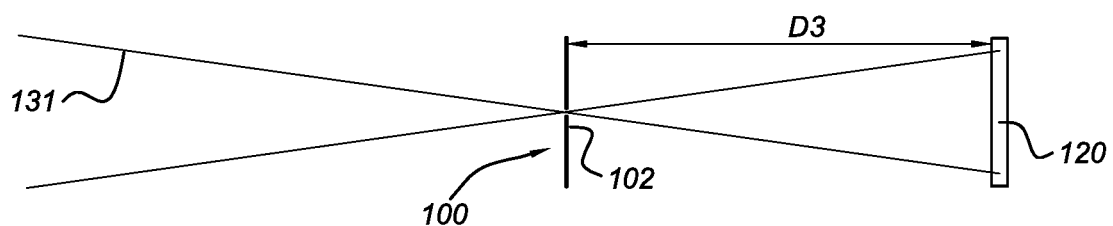

The field of view depends on the distance between the front surface with pinhole 102 and the image sensor 120 as well as on the size of the image sensor 120. FIGS. 8A and 8B show different examples. This distance D2 in FIG. 8A is smaller than the distance D3 in FIG. 8B whereas the image sensors 120 have equal size. Therefore, the camera 100 in FIG. 8A has a wider field of view than the camera 100 in FIG. 8B.

The above described embodiment comprises a two-dimensional sensor 120 and a pinhole aperture 102. However, the skilled person will appreciate that further embodiments comprising a slit and a one-dimensional sensor also fall within the scope of the present invention. Such a one-dimensional sensor can provide accurate measurements (in one dimension) whilst drastically reducing the power consumption of the sensor 120.

Figure 9:
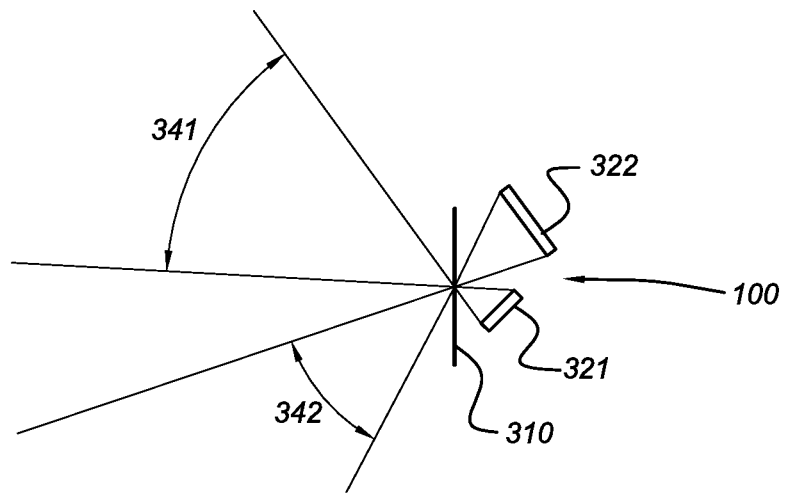

FIG. 9 shows a camera 100 according to an embodiment of the present invention in which a plurality of image sensors 321, 322 is served by one single pinhole 310. The field of view of image sensor 321 is indicated with reference number 341, and the one of image sensor 322 with reference number 342.

With a single imaging element, a non-Time-of-Flight camera cannot estimate distance. Using the pinhole concept however, adding a second pinhole at a known distance and position relative to a first pinhole would project two blobs on the image sensor. The distance of these two blobs on the image sensor is a measure of the distance to the light-source. Here, "pinhole" should be understood as including all alternative diffractive elements as explained and covered by this document, including the ones shown in FIGS. 10B-10J.

Figure 10A:
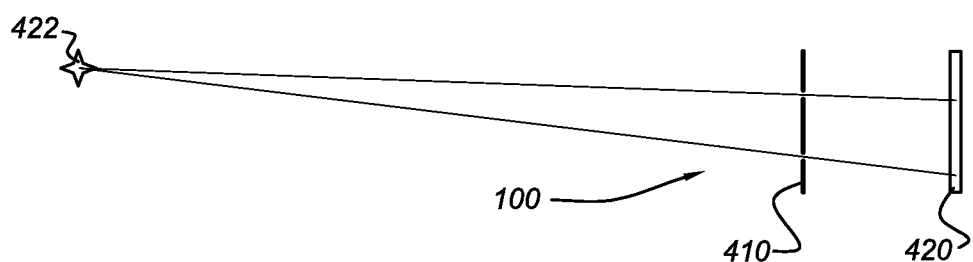

FIG. 10A shows a camera 100 with a dual pinhole arrangement 410 allowing for depth measurements using the so-called parallax method. Reference number 422 refers to a (smart) beacon. More than two pinholes can also be applied.

The accuracy of this distance measurement will depend on the accuracy of the (angular) position measurement and the distance between the two pinholes. When the pinholes are relatively close together (e.g. 1 mm), some of the systematic position errors will be highly correlated and will therefor cancel out when performing a distance measurement.

Figure 11:
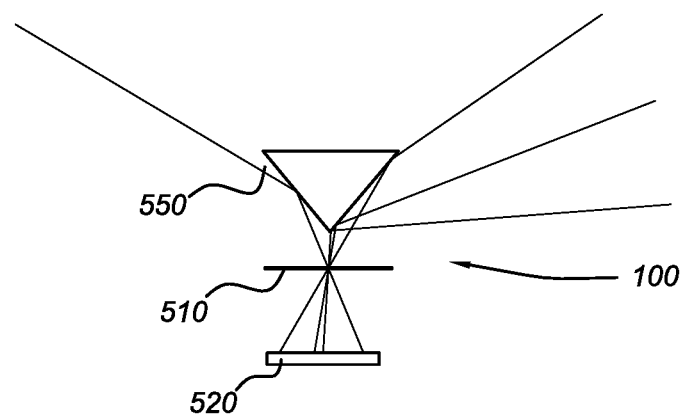

FIG. 11 shows a camera 100 in which an auxiliary optical element enabling a horizon view is applied as additional optics 105 in front of the non-refractive optics. Camera 100 has a pinhole arrangement 510, an image sensor 520 and a reflective cone 550, e.g. having an outer surface made from polished metal. A horizon view can also be achieved by mounting several sensor pinhole setups on a common base, such that the view of the individual setups would overlap.

Instead of reflective cone 550, additional optics 105 may include: a cone mirror for equatorial view, an off-axis cone mirror for wide-angle view, convex mirrors for near hemisphere view, off-axis convex mirrors for wide-angle view, etc.

The size of the pinhole 102, 310, 410, 510 may be in a range between 50 and 400 μm. Preferred pinhole sizes are 50±20% μm, 100±20% μm and 200±20% μm. However, for "tele-lens"-like fields of view a 400±20% μm pinhole may be used.

To be able to use a camera 100 with pinhole, the following issues have to be addressed:
1) due to the very slow nature of the pinhole, i.e. small pinholes with f-stops between f/50 and f/200, very little light will hit the camera sensor,
2) the pinhole image will appear un-sharp due to diffraction on the pinhole (Airy disc),
3) incident light angle dependency of the image sensor's sensitivity,
4) vignetting, and
5) optimum size of the pinhole depends on the distance to the image sensor, which also defines the field of view.

As to item 1, an optimally sized pinhole is typically much smaller that the aperture or diaphragm of refractive optics. Hence the f-stop, defined as the ratio between the focal length and the size of the pinhole is very large. In the field of photography this is called "slow" because an optical system with a large f-stop generally requires long integration times. The current system should, preferably, be able to account for the smallest pinhole (i.e. 50 μm). If one compares this to a camera with a small aperture of e.g. 3 mm, this means a factor of 3600 in photon harvest. If a normal camera has exposure times of a fraction of a millisecond to 10 seconds, it means the exposure time for pinhole cameras could be in a range of 1 second to 10 hours.

As to item 2, it is observed that position detection is aided by a de-focus super-resolution (SR) algorithm which is known to persons skilled in the art, e.g. from U.S. Pat. No. 7,003,177 and US2014/0354886. Alternatively, methods as disclosed and explained in Ioanna Tziouvara, Integration of 3D tracking systems for Interaction in Spatial Augmented Reality, Thesis, Technical University Delft, Dec. 14, 2012, may be used in the context of the present invention. Tziouvara deals with a pinhole model for a regular camera and respective transformations. Sub-pixel blob detection is also disclosed in Marcus Lindh, Development and Implementation of Star Tracker Electronics, Stockholm 2014, Space and Plasma Physics School of Electrical Engineering, Kungliga Tekniska Hogskolan. For using de-focus algorithms, in order to gain sub-pixel resolutions, in the setup of FIG. 2A with a lens system 13, the lens system 13 has to be slightly out of focus. In the setup of FIG. 2B, however, the common feature of pinholes rendering an un-sharp image provides a synergetic effect with such a de-focus SR algorithm. The size of the de-focus effect is only dependent on the Airy disc, which is dependent on the diameter of the pinhole for any given wavelength. The precise size of pinhole 102 can thus be chosen to obtain the desired diffraction for a given wavelength (λ) of illuminating light. The desired diffraction can be determined based on e.g. the resolution of the sensor 120 and/or the predetermined distance D1 or other system constraints, which will be apparent to the person skilled in the art considering the present disclosure.

Angular dependency (item 3) cannot be entirely overcome other than by selecting the best possible image sensor 120. Curved image sensors, with a radius of curvature matching the pinhole, would be ideal. However, planar image sensors have been demonstrated during development of the present invention to provide suitable image sensing. Prototypes of curved image sensors are available though they are not yet commonly available on the market. Such image sensors would form the ideal choice for the proposed system and are, therefore, envisaged as embodiments within the present invention.

Sensors that can be used are back-Illuminated (BI), Back-Side Illuminated (BSI) sensors as well as CMOS sensors, NMOS image sensors, digital photon counter DPC based image sensors, multi pixel photon counter MPPC based image sensors, CCD image sensors, and APD image sensors. However, the invention is not restricted to these types of sensors.

Vignetting can be treated by software stored e.g. in memory 15 and running on processing unit 9, using a traditional method called "flat-field compensation". Flat-field compensation is a technique used to improve quality in digital imaging. The goal is to remove artifacts from 2-D images that are caused by variations in pixel-to-pixel sensitivity of the image sensor 120 and/or by distortions in the optical path of the light beam(s). It is a standard calibration procedure in everything from pocket digital cameras to giant telescopes. Flat fielding refers to the process of compensating for different gains and dark currents in the image sensor. Once the image sensor has been appropriately flat-fielded, a uniform signal will create a uniform output (hence flat-field). This then means any further signal is due to the phenomenon being detected and not a systematic error. For the purpose of the present invention, any known flat-field compensation algorithm can be used by processing unit 9.

Figure 10B:
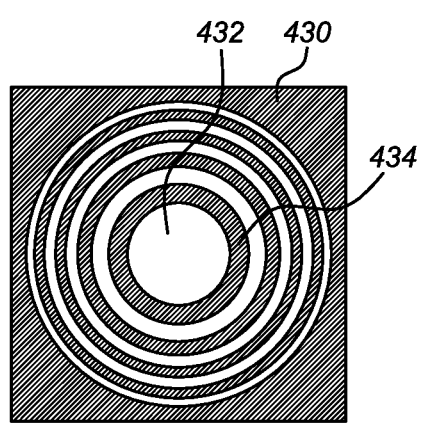

In alternative embodiments, the non-refractive optics 101 may comprise one or more Fresnel zone plates, rather than pinholes. Such Fresnel zone plates will create a brighter image. While introducing a specific focal length, zone plates can still exhibit a large depth of field and exhibit the desired un-sharpness that enhances the SR computation. A limitation of Fresnel zone plates, however, is that they are designed for a particular focal length, i.e. distance between the Fresnel zone plate and the image sensor 120, thereby defining the available field of view. An example of a zone plate 430 is shown in FIG. 10B. The zone plate 430 comprises a plurality of circular shaped, concentric transparent rings 432 which alternate with a plurality of circular shaped, concentric opaque rings 434. Inner "ring" 432 is a complete circle. FIG. 10B is an example of a so-called binary zone plate. A sinusoidal zone plate may be used instead.

A disadvantage of a zone plate having at least a few zones (called 'regular zone plate' from here on) is that the image of the light source (e.g. a LED) is changed to a large, out of focus, hardly usable shape when the position of the light source is far off-axis (angles significantly larger than zero degrees) from the camera. The reason is that the distance between the zone plate and the illuminated sensor area varies too much, depending on the angle between the direction of the light beam of the light source and the axis of the camera. On the other hand, if the light beam is close to the axis of the camera, and the zone plate is focused for that situation, the focusing performance can be too high, which causes the size of the projected light beam on the sensor to be too small (approximately one sensor pixel or less) for a good subpixel estimation.

From simulations it has been found that a useful compromise can be found between on-axis focusing performance, off-axis focusing, and the amount of passed light (which is important for the signal-to-noise ratio) if the number of opaque and transparent zones is reduced to a much smaller number than usual. An example of such an aperture is in FIG. 10C. The zone plate of FIG. 10C comprises an opaque plate 436 having one circular shaped transparent ring 438 surrounding a circular shaped opaque zone 440. The inner diameter of the circular shaped transparent ring 438 may be 115 micrometers, and its outer diameter may be 200 micrometer. Of course, any other suitable diameter may be used, as the case may be.

Figure 10C:
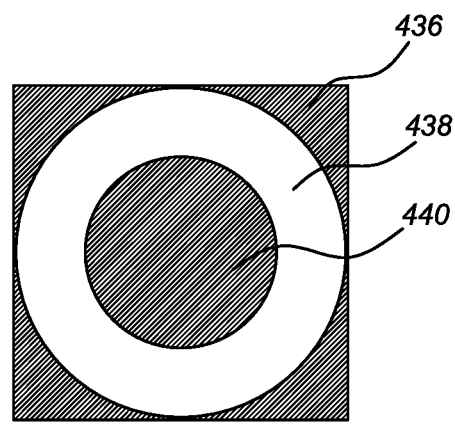

The zone plate of FIG. 10C images better, at least creates a sharper pattern (which is advantageous for estimating the subpixel position) than any round hole without circular shaped opaque zone in the center, for the given wavelength of the smart beacon light. This holds also for a smart beacon at an off-axis location.

However, alternatively, a zone plate with one or more concentric arcuate transparent rings of which at least one covers less than a complete circle can be used, as will be explained with reference to FIGS. 10D-10F, 10G-10J.

Figure 10D:
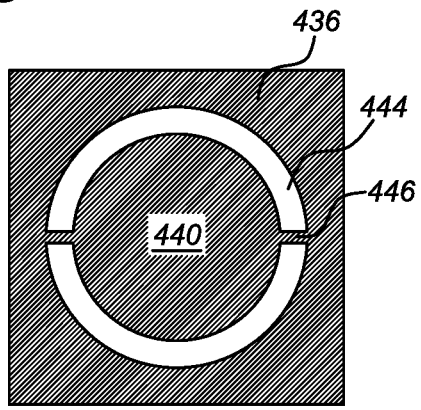

FIG. 10D shows an alternative to the embodiment of FIG. 10C. In FIG. 10D, the zone plate 436 comprises a transparent shaped opaque ring 444 which is interrupted by two small opaque bridges 446 which connect the circular shaped opaque zone 440 with the opaque zone outside the circular shaped transparent ring 444. The width of such bridges 446 preferably covers less than π/6 radials, more preferred π/8 radials, and even more preferred π/12 radials.

Figure 10E:
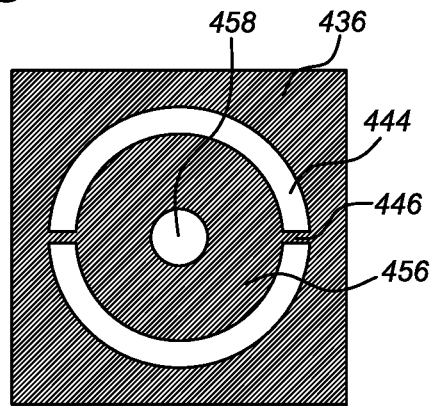

FIG. 10E shows a further example. The zone plate 436 of FIG. 10E differs from the one shown in FIG. 10D in that the circular shaped opaque zone 440 is substituted by a circular shaped opaque ring 456 surrounding a circular shaped transparent zone 458.

Figure 10F:
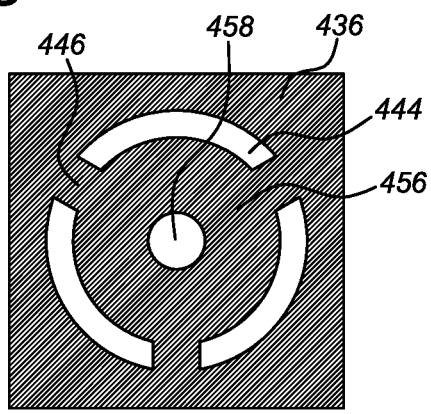

The still further example shown in FIG. 10F is identical to the one of FIG. 10E apart from the number of bridges 446 being three instead of two. The invention is not restricted to three bridges 446. Any suitable number of bridges 446 may be applied instead.

Figure 10G:
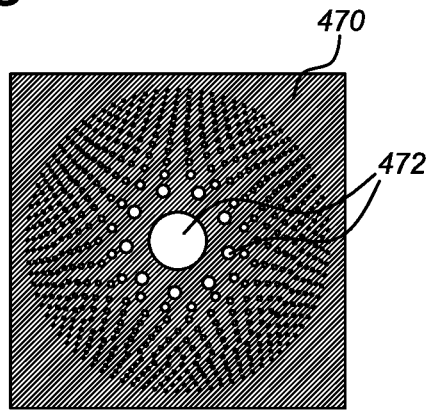

In a further alternative embodiment, the non-refractive optics 101 may comprise one or more photon sieves. A photon sieve is a device for focusing light using diffraction and interference. It consists of a flat sheet of material full of pinholes that are arranged in a pattern which is similar to the rings in a Fresnel zone plate, but a photon sieve brings light to much sharper focus than a zone plate (cf., e.g., [[https://]]en.wikipedia.org/wiki/Photon_sieve). An example of a photon sieve is shown in FIG. 10G in which the flat sheet is indicated with reference sign 470 and the plurality of holes arranged in a predetermined pattern in said flat sheet 470 with reference sign 472. For some applications such a photon sieve may be a good candidate because the focusing behavior of a photon sieve can be adjusted by fabricating holes of several different sizes and a different arrangement of the pattern of holes, like the arrangement shown in FIG. 10G.

Figure 10H:
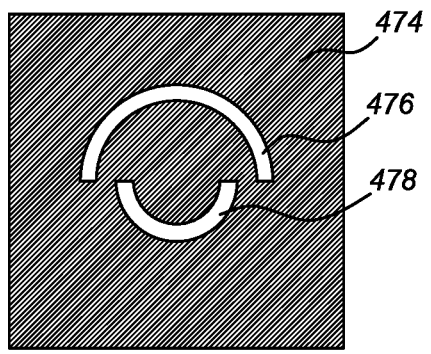

In a further alternative embodiment, the non-refractive optics 101 may comprise one or more arcuate slits. Said arcuate slits may be located at Fresnel zones. Said arcuate slits may be arranged symmetrically or asymmetrically. FIG. 10H shows an example where the non-refractive optics comprise a flat opaque plate 474 with a first arcuate slit 476 and a second arcuate slit 478. Both slits 476 and 478 have the shape of a half circle and may be implemented by transparent zones. They share a same center point located on flat plate 474 and they are arranged entirely at different sides of a virtual line on flat plate 474. However, first arcuate slit 442 may have a smaller diameter than second arcuate slit 444.

Figure 10I:
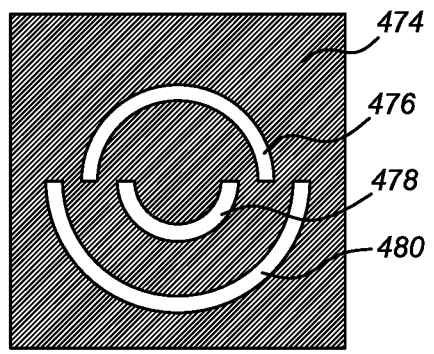

FIG. 10I shows a variant to the embodiment of FIG. 10H. I.e., the example of FIG. 10I has a further arcuate transparent slit 480 which spans π radials. Its end faces touch the same above mentioned virtual line. Arcuate slit 480 is located on the same side of that virtual line as arcuate slit 478. Arcuate slit 480 has a center point collocated with the center points of arcuate slits 476 and 478.

Figure 10J:
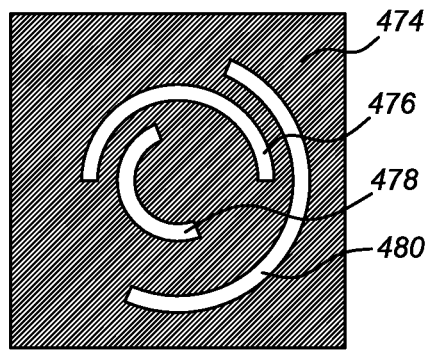

The embodiment shown in FIG. 10J only differs from the one shown in FIG. 10I in that the arcuate slits 476, 478, 480 are rotated about their collocated center point. The amount of rotation depends on the required image on the sensor.

The embodiments of FIGS. 10H-10J have a non-symmetric arrangement of transparent slits about a common center point. Consequently, distortion of its image on the sensor as caused by impinging smart beacon light depends on the solid angle relative to the axis of the camera which solid angle can, then, may be measured more accurately. In such embodiments, the more complex nature of the diffraction pattern augments the process of reconstructing the optical path way of light emitted by smart beacons, since correlations between more complex patterns provide higher confidence levels and thereby a finer resolution.

In further alternative embodiments, the non-refractive optics 101 may comprise one or more holographic optical elements. In such embodiments, the holographic optical element can be designed for a specific purpose in special applications like applications with tilt lenses (Scheimpflug principle).

In yet further alternative embodiments, the non-refractive optics 101 may comprise one or more masks. Masks can be, for example, binary masks or coding masks, more specifically, wave-front coding masks. Such masks can be either made from opaque material or by means of switchable optical elements. Switchable optical elements could be MOEMS (micro-opto-electromechanical systems) for example DMDs (digital micromirror device) or LC (liquid crystal) cells.

While the thermal capacity of the non-refractive optics 101 of the setup of FIG. 2B is very low when compared to camera 7 with the lens system, thermal stability can be further improved by implementing a temperature control system. Such a temperature control system may include a thermometer, a heating and a cooling element, and a control system to ensure the temperature is stabilized at a certain temperature. FIG. 2B shows an embodiment with a reversible (i.e. configured for both cooling and heating) Peltier element 103, to the non-refractive optics 101. The Peltier element 103 is connected to and its temperature is controlled by processing unit 9 such that non-refractive optics 101 is kept at a predetermined temperature, e.g. within a range of 20-60° C.+/−5 degK, preferably +/−1 degK, more preferably +/−0.5 degK, most preferably +/−0.1 degK.

In principle the images rendered by image sensor 120, 321/322, 420, 520 are blurred. However, when used in combination with beacons 1(i), 130, 430 each transmitting a light beam comprising a pattern discernable from background light like daylight, traffic lights, lights from buildings, car lamps, etc. Still very good measurement results can be achieved. Preferably, each beacon transmits a specific, unique pattern identifying the beacon concerned. Such light beam with specific pattern can be a blinking pattern. The processing unit 9 is arranged to filter all image components not relating to the specific (e.g. blinking) light pattern and can, thus, easily distinguish beacon light from background light and optionally even identify the beacon concerned. Results of this process are stored in a correlation matrix, in which each matrix element corresponds to a pixel of the image sensor. No extra communication between camera 100 and beacons 1(i), 130, 430 is necessary.

In order to achieve the required resolution and signal to noise ratio, relatively long integration times may be required. I.e., integration times will be in a range of 100 ms to several seconds but under extreme conditions they may up to 10 hours. Processing unit 9 may be arranged to perform noise measurements by applying a high pass filter to the correlation matrix, as instructed by suitable software e.g. stored in memory 15. By doing so, the resulting image will consist of high frequency noise with empty or dark areas in image places receiving light of locked-on smart beacons. High pass filtering, although counterintuitive, allows for measuring the noise floor, i.e., the measure of the signal created from the sum of all noise sources and unwanted signals within the system, where noise is defined as any signal other than the one being monitored. With the knowledge of the noise floor, integration times can be optimized such as to allow for determining the sweet spot between signal to noise ratio SNR and measurement speed. The longer the integration time, the better the SNR and the accuracy of the final result. However, at one point the accuracy is good enough or no longer limited by the integration time but by other factors. Hence longer integration times only slow down the measurement speed and thus the sweet spot is reached.

Alternatively, processing unit 9 may be arranged to apply a low pass filter to the correlation matrix, as instructed by suitable software e.g. stored in memory 15, such that only locked-on smart beacon signals are present in the resulting image. However, the information about the noise floor is lost when applying low pass filtering. So, as a further alternative, processing unit 9 may be arranged to apply both a low pass filter and a high pass filter, so effectively a bandpass filter with a suitably selected bandwidth, to the correlation matrix, as instructed by suitable software e.g. stored in memory 15 to obtain both the locked-on smart beacons signals and the noise floor.

In experiments it was found that blob detection to measure positions of smart beacons was stable overnight but would exhibit varying position bias during day time. This may be caused by ambient light conditions.

One cause may be non-linearity of the used image sensor. I.e., the actual projection of the impinging light beam on the image sensor may not be focused well enough, e.g. resulting in a blob corresponding to a diameter of several meters wide when using a smart beacon at a distance of e.g. 100 m. This means that background ambient light within this large area will also project the area on the image sensor projected by the smart beacon (a superposition of both sources). If the distribution of this background light in the area of the blob is not distributed symmetrically, one side of the blob may receive more ambient light than the opposite side. With a non-linear image sensor, this would then cause a different gain for one side, compared to the opposite side, resulting in different pixel amplitudes of the modulated light emitted by the smart beacon depending on the position within the blob. A simple blob detection algorithm would then exhibit a ambient light distribution dependent bias.

A potential fix for this phenomenon is to calibrate each pixel's non linearity, and compensate for it, to make it linear again in processing, removing the position bias in the blob detection caused by this effect.

Another cause may be in a bias due to quantization levels of the image sensor. I.e., detection of smart beacons may rely on detecting changes in light levels (with a particular frequency) over multiple frames. Some, or sometimes all, of the pixels forming a blob could have an amplitude which is smaller than one ADC (Analogue-Digital-Conversion) level (<1 lsb, where lsb=least significant bit), which means that, depending on the ambient light level that is superimposed for a certain pixel, it may or may not contribute to the smart beacon blob detection. Slowly changing ambient light levels over time (which could also exhibit spatial light level gradients) will therefore result in a time varying amplitude distribution of the pixels receiving light from the smart beacon, which will cause time varying position biases in the blob position detection.

A fix to this unwanted phenomenon is to add a little random noise to each pixel >1 lsb (as expressed in RMS=root mean square), before digitization, or noise having a specific pre-determined pattern. In other embodiments, one or more light sources, optically behind the non-refractive objective, can illuminate the 2D image sensor in order to create a small bias in the light sensing elements. Said one or more light sources can further be utilized for sensor calibrations of the 2D image sensor. The one or more light sources in such embodiments are actively controlled and can be operated in various configurations in synchronization or out of synchronization with the smart beacons. Said one or more light sources could be LEDs, incandescent light sources or even open ends of light guides, such as optical fibers. An example is shown in FIG. 13 which shows camera 100 having front surface 110 with pinhole 102. The (smart) beacon 130 generates light beam 131 which impinges on pinhole 102 which, then, creates an image on 2D image sensor 120. The extra light source between the front surface 110 with pinhole 102 and the 2D image sensor 120 is, here, implemented by a ring-shaped diffuse modulated light source 700 which generates a diffuse light beam 702 directed towards 2D image sensor 702. Diffuse modulated light source 700 may be connected to processing unit 9 of the camera 100 for controlling the amount of generated light to arrive at a desired amount of bias in the light sensing elements of the 2D image sensor 120. The addition of such one or more extra light sources behind the non-refractive objective can be applied in any of the arrangements explained in this document.

While in some embodiments, the angular position determinations of the smart beacons is performed by blob-detection, as discussed above, in alternative embodiments, the angular position determinations of the smart beacons is performed by reconstruction the optical pathway between the non-refractive objective and the 2-dimensional image detector in dependence of the angular positions of the beacons in respect of the non-refractive objective. Such a reconstruction uses the laws of diffractive optics in an iterative or recursive algorithm. Such an algorithm might predict the angles of light rays from the non-refractive objective to the 2-dimensional image sensor in dependence of the position of the smart beacons relative to the non-refractive objective. Such a method may make use of predictable features of the imaging optics, such as the Airy disc and the respective ring system.

Noise mitigation can also be done by providing suitable additional optics 105 in front of the non-refractive optics 101. E.g., additional optics may include one or more color filters in front of non-refractive optics 101. I.e., smart beacons used in the system may employ LEDs of a specific color, including visible and non-visible wavelengths such as infrared or ultraviolet. A simple color filter, such as a gel filter for stage lighting, can be used to drastically reduce the contribution of ambient light, thereby improving the SNR. Such gel filters have a rather broad filter curve. However, those gel filters do not introduce angular dependencies. In case of a wide field of view, such color gel filters would be preferable.

However, in applications requiring a narrow field of view, additional optics 105 may be implemented by means of interferometric filters. This may be advantageous because they have a sharper spectral response. Due to the angular dependence of interferometric filters, however, it is preferred to only use them in tele-photo-type optics, such that light beams pass the interferometric filters essentially in perpendicular fashion.

In further embodiments, the pinhole camera setup 100 of FIG. 2B can be used in combination with a camera equipped with a regular refractive objective lens, like the camera 7 of FIG. 2A. Such refractive lenses display temperature dependent aberrations. When combined with camera 100, such refractive lens cameras 7 can provide a fast measurement, because their light detector 11 has a short integration time. In such an embodiment, low frequency smart beacon signals can be accompanied by high frequency smart beacon signals, e.g. by a second beacon placed next to a slow beacon or by further modulating the slow beacon with an overlaid high frequency component. This would allow to transmit telemetry signals at higher bit rates than can be processed by a pinhole camera, which can be received by camera 7 using a refractive, i.e. e.g. bright, aka fast lens. Should thermally introduced aberrations occur, the pinhole camera 100 will still allow for accurate angle measurements. Such embodiments would also allow for vibrometric measurements since the accurate measurements of the pinhole setup can be used to correct for optical aberration in the data provided by the "fast" camera 7.

As shown in FIGS. 12A-12B, the camera 7 (or 7a, 7b) can be provided with a housing configured to withstand high temperature and/or high-pressure environments (for example a deep sea or geothermally active environment) without introducing significant error due to deformation of the optical elements. The housing (which can be used with all of the embodiments described herein) comprises at least one wall 600 surrounding a void 610. The sensor 120 is mounted within the void 610. The housing is closed by a front wall or cover in which a pin hole 102 (or another non-refractive optical element 101) is provided. The pin hole 102 is configured to form an image at the sensor 120 as described above with reference to FIGS. 7 to 11.

To prevent the void 610 becoming filled with environmental material (e.g. water in a sub-sea environment) the front of the housing is sealed with a transparent cover 620 (transparent to at least the wavelength of illuminating light from the beacon(s) 1(i)). As shown in FIG. 12A and 12B, the cover 620 can take the form of a hemispherical (constant radius) or half-ball lens positioned with its flat side against the front wall of the housing. The precise configuration of the cover 620 is not critical, but the cover 620 should be configured such that all light rays impinging on the pin hole have an angle of incidence which is normal to the optical interface. The skilled person will appreciate that by ensuring that all light rays impinge on the pin hole with an angle of incidence that is normal to the optical interface, the camera operates in the same way as a simple pinhole camera (comprising no refractive elements) because the objective (the image forming aperture) is non-refractive. Thus, although the system comprises a refractive element (cover lens 620), the optical element for projecting light on said image sensor is non-refractive.

The thickness and geometry of the cover lens 620 can be optimized according to the expected operating conditions of the device. For example, the thickness of the cover lens 620 can be determined based on at least one of the sensor size and the maximum pressure to which the device is exposed during use. The thickness of the cover lens 620 can be chosen to ensure the integrity of the cover lens 620 at a desired operating pressure. Advantageously, the cover lens 620 thickness is chosen to minimize the deformation of the cover lens 620 such that it is smaller than the required measurement accuracy during operation. As will be understood by the skilled person, the shape of the cover lens 620 can be chosen to ensure a desired field of view for the device. To minimize the impact of irregularities and manufacturing tolerances of the cover lens 620 on the image formed at the sensor 120, in embodiments comprising a cover lens 620, the cover lens 620 has a large diameter relative to the pin hole 102. In one example rated to a pressure of 300 bar, the image sensor 120 has a maximum dimension of 30 mm, and a field of view of 90 degrees, and the diameter of the cover lens 620 is approximately 70 mm. In this embodiment, the lens cover has a lens radius of approximately 50 mm.

The surface roughness of the cover lens 620 can be specified such that it approaches (or where possible falls below) a level at which the (noise) error introduced by the cover lens 620 is less than the required measurement accuracy.

The lens 620 can be provided with a coating on its flat side, with the pin hole 102 formed in the coating. The coating can be a light absorbing (black) coating or a reflective coating. In some embodiments, light absorbing coatings are preferred for stray light suppression. The skilled person will appreciate that in embodiments comprising a cover 620 with an opaque cover, the front wall of the housing can be formed by the cover 620.

On the interior side of the pinhole 102 (inside the housing), additional transparent element(s) 630 can be provided. Such an arrangement can mitigate deformation of the cover 620 at the pinhole due to situation of the camera in a high-pressure environments.

Although not shown in FIGS. 12A and 12B, a protective coating can be provided on the external surface of the cover 620. The protective coating can be configured to protect the glass cover from corrosive degradation of the cover surface.

Advantageously, an optical couplant 640 (e.g. an optical coupling gel) is provided between each of the transparent elements to provide a continuous refractive index throughout and at the boundaries between the transparent elements. For example, as shown in FIG. 12B, an optical coupling gel 640 can be provided between the cover 620 and the additional transparent element 630. Said coupling gel will also fill the area of the pinhole, to avoid refraction in the area of the pinhole. Coupling gel 640 can also be disposed between the additional transparent element and the sensor 120. Optical coupling gels, for example uncured silicone coupling gels are commercially available.

The coupling gel can be chosen to provide a constant refractive index along the light path through the pinhole 102 (or slit) to the sensor 120.

The cover lens material can also be chosen depending on the expected operating conditions of the device. For example, the cover lens material can be chosen so that the thermal expansion coefficients of structural elements are matched. For example, the thermal expansion coefficient of the cover lens 620 can be matched to that of the plate 630 positioned on the inside of the pin hole (as shown in FIG. 12B), and optionally the optical coupling gel. The thermal coefficient of these components can also be selected to match that of the image sensor 120 (i.e. silicon) and/or the adhesives used in the device. This can minimize the impact that geometry changes have on measurement.

To minimize the error introduced by the pressure dependency of the camera components, the mechanical properties of the cover lens 620 should also be chosen to maintain the geometry of the system (as far as possible) under expected operating conditions (e.g. high pressure of >300 bar in a deep sea environment may change the refractive index and should be taken care of by a suitable calibration).

As shown in FIG. 12B, cooling for the sensor 120 can also be integrated into the housing. For example, the sensor 120 can be mounted on a support 650 comprising a thermally conductive material that extends to the exterior of the housing. The housing may further comprise active cooling means, such as a Peltier element, although in deep sea environments, cooling from the environment will be sufficient with appropriate heat exchange materials.

Beacons

Now, exemplary beacons 1(i) will be described in more detail. While the description of beacons 1(i) is provided for the setup with a camera 7 with refractive optics, the description equally applies for a setup with one or more cameras 100 with non-refractive optics 101 (FIGS. 2B, 7-11) or both.

The beacons 1(i) are arranged to transmit light beams 5(i) towards the camera 7. They may be configured as passive mirrors reflecting light beams 6(i) as generated by the camera 7 and produce reflected light beams 5(i), which reflected light beams 5(i) are then received and properly processed by camera 7.

Alternatively, such beacons 1(i) may be existing light sources already mounted onto objects. For example, light houses or other maritime reference points transmit a predetermined series of light flashes controlled by the international association of lighthouse authorities (IALA) Other examples are SIGNI navigation lights, as well as the obstruction markings and lightings mounted on tall structures to alert air traffic. These latter markings and lightings are controlled by the FAA in the US and similar authorities in other nations. Yet other examples are traffic alert system like warning lights, traffic lights or matrix information signs.

As a further alternative, the beacons 1(i) can be formed by ends of optical wave guides, such as optical fibers, thereby allowing the light source in a remote location for further miniaturization. In such embodiments, the beacons 1(i) can be fit into very small spaces.

However, here, the beacons 1(i) are presented and explained as active beacons. FIG. 3 shows an example of a beacon 1(i). The example beacon 1(i) is shown to be a "smart" beacon. I.e., the beacon 1(i) comprises a processing unit 25 connected to an energy storage and energy harvesting device 31, a set of sensors 33, a memory 27, a clock 35, a light generating device 29, one or more electronic networking modules 37, an image sensor 39, and optics 41. The set of sensors 33 may comprise a tilt sensor 33(1), a position sensor 33(2), a wind speed sensor 33(3) and other sensors 33(4), like a light sensor, temperature sensor, humidity sensor, etc. Electronic networking modules 37 may comprise one or more of Ethernet, WiFi, Bluetooth, Powerline communication and NFC (Near Field Communication) modules.

Smart beacons 1(i) can also be provided with environmental sensors such as gas sensors, accelerometers, temperature sensors, anemometers, air pressure sensors, light sensors, moisture sensors, fine particle sensors, magnetometers, radiation sensors, etc.

All connections intended for transmission of data may be physical connections (wires) however, alternatively they may be wireless and based on transmission of electromagnetic/light radiation.

The processing unit 25 may be any suitable processing unit known from the art.

The energy storage and energy harvesting device 31, in its most simple embodiment, comprises a battery arranged to feed electrical energy to all other components in beacon 1(i) via suitable wires (not shown). Alternatively, there may be a connection to the mains or other energy source but that may be impracticable in many situations. The energy storage and energy harvesting device 31 may comprise a rechargeable battery and means to generate electrical energy to recharge the rechargeable battery, like a small solar panel, wind mill, fuel cell, etc.

Clock 35 provides clock signals to processing unit 25, as known to a person skilled in the art. The clock signals are used for the normal processing of processing unit 25. Processing unit 25 may base a time stamp on these clock signals.

Memory 27 may comprise different types of sub-memories, like ROM (Read Only Memory) types of memory storing suitable program instructions and data to run the processing unit 25. Also, memory 27 will comprise suitable RAM (Random Access Memory) types of memory for storing temporary data like data received via optics 41 and image sensor 39. Memory 27 may also comprise cache type memory. Processing unit 25 may also be arranged to send such sensor signals to a remote unit via electronic networking module 37 for external storage and processing. A local copy of these sensor signals may then, but need not be, stored in local memory 27 within beacon 1(i).

Memory 27 may store initial position data indicating the initial position of beacon 1(i). Such initial position data may have been established by using a theodolite and then be stored by a user. The user may have sent such initial position data to the processing unit 25 e.g. via the electronic networking module(s) 37.

Memory 27 may also store a beacon ID identifying beacon 1(i) and being used by processing unit 25 in external communications with other devices to identify itself to those other external devices.

Position sensor 33(1) and tilt sensor 33(2) may include one or more accelerometers and/or gyrometers/gyroscopes, as is known to a person skilled in the art. Such accelerometers and/or gyrometers/gyroscopes measure the beacon's own motion and derive an updated beacon position and orientation from such measurements. The updated beacon position and/or orientation is then stored by processing unit 25 in memory 27.

The light generating device 29 comprises at least one light source like a Light Emitting Diode (LED) source configured to generate light. Processing unit 25 is arranged to control such LED source such that it generates light beam 6(i). Alternatively, the light generating device 29 comprises at least one of a VCSEL (Vertical-Cavity Surface-Emitting Laser), an EEL (Energy Efficient Lighting), incandescent light bulb, fluorescent light source, and light converting element.

Beacon 1(i) may be provided with optics 41 like a suitable simple lens arranged to receive ambient light and transfer such received light, preferably by properly focusing to image sensor 39. Such image sensor 39 may be simple light sensor which converts received light into a sensor signal for processing unit 25 which stores the sensor signal in memory 27. This setup allows for beacons 1(i) also acting as measurement devices. Further, in such an embodiment, several beacons 1(i) together can form a mesh network.

The beacons 1(i) are, preferably, arranged to transmit a special light pattern of flashes that contains embedded telemetry data. To this means, the light pattern may be modified or modulated to encode the embedded telemetry data. Even though the embedded telemetry data and thus the exact light pattern is not known beforehand by the receiver (camera 7), the light pattern still contains enough predetermined elements so that the camera 7 can use correlation techniques to discern the beacon's light pattern from other light sources. This will be explained in further detail hereinafter.

There are multitude of methods to embed telemetry data in such a light pattern. One method is modulation, including any form of amplitude, frequency and phase modulation. Common examples of modulation are PSK (phase shift keying), FSK (frequency shift keying), ASK (amplitude shift keying), QAM (quadrature amplitude modulation). These methods all employ a fixed "carrier" frequency that is easily detected by the receiver (camera 7). Another method is using spread spectrum techniques like code division multiple access.

Light polarization can be modulated by moving filters or filter wheels. Light polarization can further be modulated by electro-optic modulators, such as Pockels cells. Beacons modulated with polarization will have the advantage that the modulation is essentially invisible to the unaided human eye.

Color coded modulation can be achieved with multi-color LEDs. The detection of such color modulated beacons can be achieved by reading out the individual color channels of a color image sensor, such as an image sensor provided with a Bayer CFA (color filter array), or any equivalent color image sensors.

Modulated Light

Now some more details as to modulation will be provided which can be used in all embodiments explained in the present document.

The light generation devices 21 and 29 can be arranged to modulate their output light beams such that they carry additional information. One way to do so would be to modulate the current supplied to the light generation devices, e.g. LEDs. Alternatively, as shown in FIG. 4 this can be achieved by modulating light polarization by moving filters or filter wheels. FIG. 4, in its upper part, shows a light source 42(i), a rotatable linear polarizer 43(i), a static linear polarizer 47(i), and a photo diode 48(i). The rotatable, linear polarizer 43(i) is arranged such that it receives light as emitted by light source 42(i) and transmits linearly polarized light 45. The static linear polarizer 47(i) receives the polarized light 45 and transmits an amount of light to photo diode 48(i). The amount of light depends on the orientation of the static linear polarizer 47(i) relative to the orientation of the polarized light 45, as is known to persons skilled in the art. As shown in the upper part of FIG. 4, the rotatable linear polarizer 43(*i*) is arranged such that the orientation of the polarized light 45 100% matches the orientation of the static linear polarizer 47(*i*) such that a maximum amount of light is transmitted to photo diode 48(*i*), as indicated by a white circle 49(*i*). This maximum amount of light is transferred into a maximum current by photo diode 48(*i*). This is schematically indicated by curve 51(*i*). as long as the orientation of rotatable linear polarizer 43(*i*) remains in this position, current 51(*i*) will remain at this maximum level.

The middle part of FIG. 4 shows a situation where the rotatable linear polarizer 43(*i*) is rotated by π/2 (or any odd multiplication thereof). In such a case, as the person skilled in the art will know, polarized light 45 will be oriented such relative to static linear polarizer 47(*i*) that no (or a minimal) amount of light 49(*i*) will be transmitted by static linear polarizer 47(*i*), as indicated with a black circle. So, the current produced by photo diode 48(*i*) will also be minimal as indicated by curve 51(*i*).

The processing unit 9 of camera 7 and/or processing unit 25 of beacon 1(*i*) is arranged to control the rotation of the rotatable linear polarizer 43(*i*). It can be arranged to control rotation of the rotatable linear polarizer 43(*i*) such that it changes abruptly from the orientation shown in the upper part of FIG. 4 to the middle part of FIG. 4. Then, the output current of photo diode 48(*i*) shows a square wave pattern in which the current 51(*i*) switches between a maximum (upper part) and minimum (middle part) value. However, the processing unit 9, 25 can be programmed to control rotation of rotatable linear polarizer 43(*i*) such that a changing current value 51(*i*) is produced in any desired form, e.g. saw tooth or sine wave shape, as shown in the lower part of FIG. 4.

Of course, alternative setups can easily be designed. E.g. the rotatable linear polarizer 43(*i*) and static linear polarizer 47(*i*) can change positions.

As an alternative, light polarization can be modulated by electro-optic modulators, such as Pockels cells or liquid crystal (LC) cells. Beacons modulated with polarization will have the advantage that the modulation is essentially invisible to the unaided human eye.

In an embodiment, color code modulation is applied. Color coded modulation can be achieved with multi-color LEDs, as shown in FIG. 5. FIG. 5 shows, as an example, that light source 42(*i*) is made of three separate LEDs, e.g. a red light, green light and blue light emitting LED. On the right-hand side, an example of light output signals of these three LEDs as a function of time t is shown. Processing unit 9, 25 is arranged to control these individual color LEDs such that they emit light in accordance with a controlled time schedule. All these light colors can be modulated such that a certain total output color is generated. While the diagram shows on/off modulation only, multi-color LEDs will also allow for brightness variation in the individual colors, thereby offering the option of further modulating the respectively color light beam with a carrier, which in itself can be modulated, e.g. by PSK. An advantage of multi-color modulation is that with every additional wavelength, additional bandwidth is made available for data communication.

The detection of such color modulated beacons can be achieved by reading out the individual color channels of a color image sensor, such as an image sensor provided with a Bayer CFA (color filter array), or any equivalent color image sensors.

Functionality

The basic idea is that camera 7 (or 100) is arranged on a fixed position such that it is static. Then, the static position is known and stored in memory 15 accessible by processing unit 9 in camera 7.

When all beacons 1(*i*) have been installed they have an initial position which may be stored in their own memory 27 and in camera's memory 15. Such beacons initial position data may have been stored in memory 15 by manually inputting such data into the camera 7 via input unit 19. Alternatively, a user may have sent such data to camera 7 via the electronic networking module 20, either via a wire-connection or a wireless connection. As a further alternative, the beacons 1(*i*) may be smart such they can send their own stored initial position data to the camera 7, e.g. via their electronic networking module 37.

Thus, when the system starts, camera 7 knows all initial positions of beacons 1(*i*) which correspond to an initial position and orientation of object 3 to which the beacons 1(*i*) are attached.

Processing unit 25 of each beacon 1(*i*) executes a stored program from memory 27 that instructs the processing unit 25 to control light generating device 29 to generate a light beam 6(*i*) transmitted to camera 7. Light beam 6(*i*), preferably, has the form of a series of consecutive pulse shaped light signals where each one of them has an amplitude controlled by processing unit 25. Over time, e.g., the amplitudes of consecutive pulses may be such that the series shows a sine wave pattern. Each one of the beacons 1(*i*) may have its own characteristic sine wave frequency such that the frequency is an ID for each distinct beacon 1(*i*). Camera 7 can easily detect such wave frequency and, by doing so, identify from which beacon 1(*i*) it receives a certain light beam 6(*i*). Camera 7 receives consecutive images from light detector 11 and stores them in memory 15. These consecutive images form a video containing data relating to the consecutive pulses of all individual light beams 6(*i*).

The processing unit 9 is arranged to calculate an initial solid angle of incidence of each of the consecutive pulses of each light beam 6(*i*). I.e., each received consecutive pulse is focused by lens system 13 on one or more light sensitive elements of light detector 11. Processing unit 9 determines which one these light sensitive elements are and then establishes the solid angle of incidence of the corresponding light pulse. Techniques to do so are known to persons skilled in the art and need no further detailed explanation here.

When the object 3 is stable, i.e., does not move, the positions of all beacons 1(*i*) is also stable. Consequently, the solid angle of incidence of each light pulse on the camera's light detector 11 is fixed. However, as soon as the object 3 moves, or parts thereof, this solid angle of incidence of the consecutive pulses of one or more light beams 6(*i*) changes. The processing unit 9 is arranged to calculate this change of the solid angle per light beam 6(*i*).

FIG. 6 shows an example of consecutive steps in the method of the invention.

The camera system 7 receives the light beams 5(*i*) from a beacon 1(*i*) that is projected onto the light detector 11 by lens system 13. FIG. 6 depicts how the flow of processes, performed by processing unit 9, is to extract all relevant beacon data.

The first step in the processing is to capture at least two, but preferably many images in a sequential order. Each image is essentially a 2D array of light values. By capturing a sequence of images, a 3D matrix of light values is formed. The axes in the 3D matrix are X, Y and time T. In one embodiment a sequence of 100 images are captured with an interval of ⅟60 s.

The sequence of images is correlated with one or more predetermined patterns stored in memory 15. This process produces one or more 2D correlation matrices. Each X/Y coordinate in these correlation matrices correspond to the X/Y pixel locations in the original sequence of images.

The value of each X/Y coordinate in a correlation matrix is a measure of the correlation of the light pattern received at that X/Y location and the predetermined pattern stored in the memory 15. A high value at an X/Y position in the correlation matrix corresponds to a large correlation (e.g., the received light ray at that X/Y location behaves like the predetermined pattern). A low value at an X/Y position in the correlation matrix corresponds to a low correlation (e.g., the received light ray at that X/Y location does not behave like the predetermined pattern).

The beacons $1(i)$ transmit a pattern that correlates well with the predetermined pattern(s) stored in memory 15. Therefore, each X/Y location in the original sequence of images that received light beam $5(i)$ from a beacon $1(i)$ will produce a high value in the X/Y location of the resulting correlation matrix. Background light like static light (sunlight, street lighting, lighted signs, etc) or moving lights (like car head lamps, airplanes, light reflection in water ripple, etc) will not correlate well and thus produce low values in the correlation matrix. Other modulated light sources that transmit light with a pattern different from the predetermined pattern will also produce low values in the correlation matrix. The resulting correlation matrix is thus a "map" of candidate beacon locations.

In one embodiment, the beacons $1(i)$ transmit a sinusoidal light pattern with a fixed frequency of e.g. 7.5 Hz (other values are, of course, possible). To generate the correlation matrix Cm(amplitude) the following correlation method could be used:

$$Cm(inphase) = \Sigma_0^i \sin\left(\frac{2\pi}{60} \cdot 7.5 \cdot i\right) \cdot image_i$$

$$Cm(\text{quadrature phase}) = \Sigma_0^i \cos\left(\frac{2\pi}{60} \cdot 7.5 \cdot i\right) \cdot image_i$$

$$Cm(\text{amplitude}) = \sqrt{Cm(inphase)^2 + Cm(\text{quadrature phase})^2}$$

The sequence of images is correlated with the 7.5 Hz fixed frequency sinusoidal predetermined pattern in formula (1) and (2). A person skilled in the art would recognize that by correlation with both the sine and the cosine version of the sinusoidal pattern, phase differences between the beacon and the camera system are accounted for. By calculating the modulo of the vector formed by the in-phase and quadrature phase components a correlation matrix Cm(amplitude) is calculated. In this particular embodiment the correlation matrix Cm is calculated over a large number of images thus increasing the system gain tremendously and yielding a very high signal to noise ratio. By further rejecting signals which do not correlate, noise can be suppressed, which allows for very low light measurements, thereby allowing for pinhole imaging.

The resulting correlation matrix is examined for candidate beacons by means of a simple threshold. All pixel locations with a value higher than the threshold value are considered candidate beacon locations.

In another embodiment an out of focus lens system is used for reasons explained further. This produces an airy disk spanning a large number of pixels for each received light beam $5(i)$. Because the energy is smeared over several pixels, the correlation value of the pixel location may fall below the threshold value. In that case, an additional processing step may be added: by down sampling the correlation matrix to a lower resolution, the signal to noise ratio is increased considerably allowing the use of a lower threshold to detect candidate beacon locations.

For each candidate beacon location, the precise angle from which the light ray originates must be calculated. In one embodiment, a lens system 13 with a horizontal FOV (field of view) of 60 degrees is used that projects light on a light sensor 11 with a horizontal resolution of 1920 pixels. The resulting angular resolution is thus 60°/1920 px=0.03° per pixel. To further improve the resolution, subpixel resolution is needed. The subpixel location of the beacon is then computed by determining the "centre of gravity" of the beacon image over all the pixels forming the image. To further aid in this process, lens system 13 can be deliberately aligned such that the projected image on sensor 11 is out of focus thus creating a large unfocussed light disk. Alternatively, a small aperture could be used to create diffraction (as in the above described embodiments comprising a non-refractive objective). This produces an Airy disk spanning a large number of pixels. Such an embodiment has the advantage of increasing the depth of field such that beacons close by and far away produce similar sized projections.

Optionally, each candidate beacon location is examined for the embedded telemetry data by demodulating the light signal in the sequence of images. When the beacon is a smart beacon containing telemetry data this data is extracted and can be used to accept or reject the candidate beacon. When no telemetry data is found the light comes from an alternative light marker such as known light signatures of warning and/or navigation lights or strobes. In the latter case, such a beacon can be accepted or rejected upon further examination.

Advantageously, the candidate beacons can emit light at a frequency with a near-visible wavelength, e.g. infrared. The associated image sensors should be configured accordingly. Beacons and sensors configured in this manner can be advantageous because they do not present a visible flashing light, which can be distracting to observers or prohibited by the authorities (e.g. in the vicinity of highways).

Applications

Now some possible applications of the above described system will be explained. For all applications it is required that movements are not too fast to be tracked by the non-refractive camera. If such movements to be tracked are expected to be faster than that it may be required to revert to cameras with refractive lenses, or a combination of one or more non-refractive cameras and one or more refractive cameras.

1. Replacement of Theodolite/Total Station

Theodolites are used to measure angles and total stations add a distance measurement to that. The setup of FIGS. 2A, 2B including the beacons can be used to measure angles too and can, thus, be used as an alternative to a system in which a theodolite is used. By using a second such setup at another location relative to the same beacons, a second angle can be measured such that, by using well known triangulation calculations (or any other equivalent mathematical operation), also distances can be calculated. Distances could also be measurement in case time of flight measurements are applied in the systems shown in FIGS. 2A and 2B An average Total Station is used to measure distances in a range of sub-centimetres accuracy and angles in an accuracy range of a few millidegrees to sub-millidegrees. Such Total Stations can also be used to measure heights based on triangulation. Theodolites, Total Stations and robotic Total Stations are expensive and delicate instruments with moving parts. Especially, the non-refractive camera 100 described above has no moving parts, and when used together with the beacons, has a comparable resolution/accuracy as theodolites and can be manufactured at lower costs. The setup of FIG. 2B (and 2A) can be of special advantage in situations where one expects large movements of objects because in such situations robotic Total Stations may lose track and mix up light beams of different beacons. The setup of FIG. 2B may keep track of the individual beacons when they transmit light beams comprising beacon IDs as explained above. Moreover, the setup of FIG. 2B can be very small and, thus, applied in small spaces. Cameras 100 can be easily hidden in inconspicuous spaces hardly visible to bystanders such that they cannot be identified, stolen and/or damaged easily.

2. Earthquake Monitoring

Groningen, a province in the Netherlands, is suffering from frequent earthquakes of varying intensity, causing structural damage to many buildings and perhaps also plants and civil infrastructure. The above described monitoring system and method can capture vibrations and displacements of any part of a structure in its field of view, at very low cost and allow for automated processing and analysis. Especially when vibration frequencies are expected to below a certain threshold, non-refractive cameras can be used. This is believed to provide objective observation material, which can be used in damage assessment and/or safety analysis. The cameras could be fitted with 6DOF motion sensors to be able to subtract the camera motion due to the quake. The permanently fitted cameras would be configured to continuously record data locally i.e. using a circular buffer of a day or so. If an earthquake happened, the data will be automatically downloaded to the cloud using a 4G wireless connection, where the data is automatically processed and analysed. The system could automatically detect points of interest that need attention. Observers would then be able to look at the data and the analysis through a web portal. This portal could i.e. provide an image of the object where points of interest are highlighted. By clicking on a point of interest, it would then visualize a motion magnified movie of what happened during the earthquake. If necessary, multiple cameras observing the same object from different angles, could provide 3D vibration and displacement vectors.

The hardware could consist of a wide-angle camera, a processor and storage device, a MEMs motion sensor, 4G connectivity, and a power supply (if required with solar cells, if no power is available).

3. Asset Integrity Monitoring in Oil Refineries

Refineries contain hundreds of kilometres of pipes, thousands of pumps, many distillation columns, storage tanks and flare stacks. Using existing technology, it is possible to provide accurate 3D snapshot overviews of these assets, but that does not detect hazards or potential hazards. It merely creates a 3D model of the assets at a certain time, and allows to detect changes to the structure (i.e. addition or removal of components).

The above explained system and method could provide the following additional information of any small or large object (i.e. pipes, rotary equipment, columns and tanks) in the field of view of the camera (provided movements are not too fast to be tracked by the non-refractive camera), by just fitting cameras observing the assets:

Vibration analysis
Sub mm displacement analysis
Gas or fluid leak detection
Fire or excessive heat detection
NFRM analysis (detecting change in the natural resonant frequencies, which could be an indication of failure or imminent failure)
Detecting whether a pump is running (so vibrating) or not, and how fast it runs (frequency).
Detecting the amplitude of vibration through a pipe as an indication of the amount of turbulent flow.
Measuring very low frequency displacements (temperature related expansion, contraction, or other) of a variety of objects (pipes, pumps, tanks, etc.)
Measuring deformation of objects like tanks due to load (i.e. storage of oil etc.)

The cameras would be fitted with 6DOF motion sensors to be able to subtract the camera motion due to wind etc. The cameras would be configured to continuously download image data to the cloud using a wireless connection, and automatically process and analyse the data. The system could automatically detect points of interest needing attention and, if necessary, generate alarms. An observer would be able to look at the data and the analysis through a web portal. This portal could i.e. provide an image of a part of the refinery, where points of interest are highlighted. By clicking on a point of interest, it would then visualize a motion magnified movie of what happened causing the alarm or what triggered the highlight. If necessary, multiple cameras observing the same object from different angles could provide 3D vibration and displacement vectors and leak information.

The hardware could consist of a wide-angle camera, a processor and storage device, a MEMs motion sensor, wireless radio modem (i.e Wi-Fi), and a power supply.

4. Integrity Measurement of Fixed Offshore Production Platforms and Jack-Up Drilling Rigs An existing method to monitor integrity of fixed offshore production platforms and jack-up drilling rigs is to fit vibration sensors on the platform and perform NFRM (Natural frequency Resonance Monitoring) analysis to detect changes which could be an indication of failure or imminent failure.

This analysis however will be limited to the points where a sensor is fitted.

Using the above explained system and method however, a single camera could observe an almost unlimited number of points of interest (anything within the camera view, including flare stacks) and could perform the following measurements, most of which cannot be performed with a vibration sensor:

Vibration analysis (including very low frequency)
Displacement analysis
Gas or fluid leak detection
Excessive heat or fire detection.
NFRM analysis (detecting change in the natural resonant frequencies, which could be an indication of failure or imminent failure.
Detecting whether a pump is running (vibrating) or not, and perhaps even how fast it runs.
Detecting the amplitude of vibration through a pipe as an indication of the amount of turbulent flow.
Measuring very low frequency displacements (temperature related expansion, contraction, or other) of objects (pipes, pumps, tanks etc.)
Measuring deformation of objects like tanks due to load (i.e. storage of fluid etc.)

The cameras could be fitted with high grade 6DOF motion sensors to be able to subtract the camera motion, and also provide a vibration measurement local to the camera not depending on vision. The cameras would be configured to continuously or periodically download image data to the cloud using a wireless connection (to the platform internet connection), and automatically process and analyse the data.

The system could automatically detect points of interest needing attention and if necessary generate alarms. The observer would be able to look at the data and the analysis through a web portal. This portal could i.e. provide an image of the platform, where points of interest are highlighted. By clicking on a point of interest, it would then visualize a motion magnified movie of what happened causing the alarm or triggering the highlight. If necessary, multiple cameras observing the same object from different angles, could provide 3D vibration and displacement vectors and leak information.

The hardware would consist of a wide-angle camera, a processor and storage device, a MEMs motion sensor, wireless radio modem (i.e. Wi-Fi), and a power supply.

5. Vortex Induced Vibration in Subsea Pipelines, Risers, Jumpers and Other Conductors ViV (Vortex induced Vibration) in subsea pipelines, risers, and conductors is a common threat to the integrity of the objects, due to the risk of fatigue induced failure. A common method to measure VIV is to fit a vibration sensor to the object. Fitting a sensor to a subsea structure however is a time-consuming process. The technology as described here would be able to measure VIV remotely by simply placing a camera at the seabed and observing the object from a (small) distance.

The system can perform the following measurements:
Displacement and subsidence monitoring
Vibration monitoring The ROV (Remotely Operated Vehicle) would deploy the units at some critical points around a subsea field to monitor a pipeline free-span or unsupported jumper. The ROV then carries on doing CVI surveys around the facilities.

At the end of the campaign the ROV picks up the camera units, downloads data, and recharges batteries ready to go to the next facility.

6. Dynamic Vessel Hull Shape and Stress Monitoring of FPSO's and other Large Floating Structures The invention may also be applied in (FPSO=Floating Production, Storage and Offloading) Dynamic vessel hull shape and stress monitoring. FPSO's or other large floating structures are exposed to a lot of stress depending on load and the environment (wind, waves and current). Over time, these stresses can cause fatigue and failure, potentially leading to a catastrophic disaster and loss of lives. Current methods to monitor and measure these stresses are to fit strain gages at many points to the hull, and/or fitting precise satellite beacons at a number of locations on the structure. Precise pitch & roll sensors may also be used to derive differences in pitch and roll on different parts of the structure. These methods are all expensive to install, and still give a limited insight into the dynamic shape and stress of the hull.

The system and method as described here could be used to continuously measure and monitor the dynamic shape of the entire structure (visible within its field of view), at the mm level. One or more cameras could be fitted on high structures on the hull providing an overview of the structure below.

From these measurements, the stresses in the hull can be derived, which can be used for fatigue analysis.

Simultaneous measurement of weather information (wave height and direction, wind speed and direction, current and direction), could be used to correlate the hull dynamic behaviour to the environmental forces and the load it is carrying.

Continuous automated analysis on board (perhaps using machine learning techniques) could, over time, lead to a model where the dynamic behaviour of the hull for different weather conditions can be predicted. Observed differences between the predicted behaviour and the model could then indicate imminent failure and set off alarms.

The hardware for this set-up would be relatively simple: One or more cameras fitted on a high point on the structure, and a processing station would be sufficient.

7. Stress Monitoring of Heavy Lift and Transport Motion Monitoring.

Large structures are often assembled onshore, and transported to an offshore location. The lifting of these structures and its transport induce stresses in the structure that may need to be measured to monitor fatigue or measure the maximum stress the structure was exposed to during transport. The invention may be an elegant solution to perform these measurements as it does not require fitting sensors onto the structure. The invention may also be practical to measure stresses in the cranes performing these heavy lifts.

8. Windturbine Vibration Monitoring

The technology, presented here, may be of interest to measure vibrations in, possibly off shore, wind turbine structures. For this purpose, one may fit a MEMS 6DOF compensated camera on a number of wind turbines observing other wind turbines. The motion of the camera due to the turbine it is fitted on would have to be subtracted from the motion it measures.

The disclosed technology can also be used in indoor navigation systems, in which the beacons can be used to identify and mark a specific location. Said navigation systems can be use within buildings, tunnels, mines, or other environments in which conventional navigation methods are not useable.

9. Sub-Sea Metrology

Metrology as it is intended here, is the art to measure the relative distances, the relative orientation and often also the shape between two objects. Often this is required to be able to fabricate a mechanical piece (i.e. pipe or beam) to fit between the two objects.

Embodiments of the present invention can also be used to accurately map the relative position of sub-sea connection points (e.g. sub-sea wellheads, manifolds, etc.) to allow production of connecting components to precise specifications. For example, by positioning a stadia rod 38*a*, 38*b* comprising multiple beacons and suitably arranged cameras 7*a*, 7*b* (as shown in FIG. 1G) fixed relative to a connection port, the relative location and orientation of the connection points can be determined. The surveying arrangements 3*a*, 3*b* perform the measurement. Each one is integrated with, e.g., two LED's on the same unit, so that the other arrangement can measure it: the two arrangements measure towards each other, and the two LEDs at a fixed and known distance allow the range to be calculated. As the devices also contain pitch and roll sensors, both distance and relative 3D attitude can be measured.

For subsea applications it could e.g. be the metrology required to fabricate a spool-piece or jumper to connect a subsea wellhead to a subsea manifold. For on-land construction work, it could be e.g. the metrology required to fabricate a beam which spans from one object to another. The accuracy of the metrology (and also the fabrication process) in all of these cases needs to be such that the piece will fit within the tolerance specified. A second application of metrology (both subsea and on land) could be the verification that one or more objects were manufactured within the tolerances specified, i.e. the roundness and the diameter of a pipe or flange.

10. Subsidence and Displacement Monitoring

Assets like buildings, bridges, tunnels, subsea installations like wellheads and manifolds, offshore platforms, etc. appear to be static objects. In practice however, they are not. There are many, often external influences why a construction will move either in its entirety or part of the construction introducing mechanical stress which could lead to damage or even collapse. These influences could be due to the foundation to be instable, the soil could become unstable, digging a tunnel underneath existing structures, earthquakes, thermal expansion and contraction, failing beams in a construction due to fatigue and or corrosion, wind, precipitation, water seepage and current, soil liquefaction due to vibrations etc.

Construction engineers responsible for the safety and integrity of these structures are therefore interested to measure these displacements (and that includes subsidence) with high accuracy. The displacements could be abrupt, but very often also very gradual. High accuracy measurements will reveal these slow trends in displacement over a shorter period of time, which allows the engineers to intervene and take measures to stop the process before the structure becomes irreparable or to avoid a structure even collapses or breaks-up.

The invention claimed is:

1. An apparatus for monitoring positions on an external object having at least one beacon attached thereto, the apparatus comprising:
   at least one non-refractive optical element configured as objective for projecting light on at least one image sensor and configured to receive at least one light beam transmitted from the at least one beacon and project the at least one light beam on the at least one image sensor, wherein the at least one non-refractive optical element comprises a diffractive element configured to diffract the at least one light beam to form a diffracted light pattern on the at least one image sensor;
   the at least one image sensor configured to form image data based on the at least one light beam and background light; and
   a processing unit configured to enable communication with a memory storing a computer program comprising instructions and data, which when executed by the processing unit, causes the processing unit to:
   process the image data to filter image data components relating to the background light and render image data components relating to the at least one light beam;
   identify the at least one beacon within the image data based on the at least one light beam;
      determine current location data of the at least one beacon based on the image data;
      compare the current location data with former location data of the at least one beacon as stored in the memory; and
      determine whether the object has moved relative to a fixed reference frame based on the comparison.

2. The apparatus according to claim 1, wherein the at least one non-refractive optical element comprises at least one of a pinhole, two or more pinholes, one or more slits, one or more zone plates, one or more holographic optical elements, or one or more masks, including binary masks, coding masks and wave front coding masks.

3. The apparatus according to claim 2, wherein the one or more zone plates are one of a Fresnel zone plate, a zone plate with a plurality of circular shaped concentric transparent rings, and a zone plate with one or more concentric arcuate or circular transparent rings of which at least one covers less than a complete circle.

4. The apparatus according to claim 1, wherein the at least one image sensor comprises a two-dimensional image sensor.

5. The apparatus according to claim 1, further comprising:
   a thermostat coupled to the processing unit, the processing unit configured to control a temperature of the at least one non-refractive optical element via of the thermostat.

6. The apparatus according to claim 1, wherein the at least one image sensor is at least one of a NMOS image sensor, digital photon counter DPC based image sensor, multi pixel photon counter MPPC based image sensor, CCD image sensor, CMOS image sensor and APD image sensor.

7. The apparatus according to claim 1, wherein the processing unit is configured to identify a specific, unique pattern in the image data and identify the at least one beacon.

8. The apparatus according to claim 1, wherein the processing unit is configured to apply at least one of a high pass filtering on the image data to measure a noise floor, a low pass filtering to the image data to render image data components relating only to locked-on smart beacon signals, and a flat-field compensation algorithm.

9. The apparatus according to claim 1, further comprising:
   at least one of a cover lens, a cone mirror for equatorial view, an off-axis cone mirror for wide-angle view, convex mirrors for near hemi-sphere view, off-axis convex mirrors for wide-angle view, a colour filter, and an interferometric filter.

10. The apparatus according to claim 1, wherein the at least one image sensor comprises a plurality of light sensitive elements configured in a two-dimensional matrix forming an image plane and wherein the non-refractive optical element comprises a pinhole.

11. The apparatus according to claim 1, wherein the at least one image sensor comprises a line sensor having plurality of light sensitive elements configured in a one-dimensional matrix, and wherein the at least one non-refractive optical element comprises a slit.

12. The apparatus according to claim 11, wherein the slit is oriented perpendicular to a line sensor longitudinal direction.

13. The apparatus according to claim 1, comprising one or more extra light sources configured optically behind the at least one non-refractive optical element and configured to illuminate the at least one image sensor in order to create a bias in light sensing elements of the at least one image sensor.

14. The apparatus according to claim 1, further comprising:
   a housing comprising at least one wall surrounding a void, wherein the at least one image sensor is mounted within the void, and wherein the housing is closed by a front wall or cover in which the at least one non-refractive optical element is provided.

15. The apparatus according to claim 14, wherein the front wall or cover is sealed with a transparent cover.

16. An apparatus for monitoring positions on an external object having at least one beacon attached thereto, the apparatus comprising:
   at least one non-refractive optical element configured as objective for projecting light on an image sensor and configured to receive at least one light beam transmitted from the at least one beacon and project the at least one light beam on the image sensor, wherein the at least one non-refractive optical element comprises a diffractive element configured to diffract the at least one light beam to form a diffracted light pattern on the image sensor;

the image sensor configured to form image data based on the received at least one light beam; and a processing unit configured to enable communication with a memory storing a computer program comprising instructions and data, which when executed by the processing unit, causes the processing unit to:

identify the at least one beacon within the image data based on the at least one light beam, determine current location data of the at least one beacon based on the image data, compare the current location data with former location data of the at least one beacon as stored in the memory, and determine whether the object has moved relative to a fixed reference frame based on the comparison.

17. The apparatus according to claim 16, wherein the processing unit is further configured to identify the at least one beacon based on image processing of the image data.

18. The apparatus according to claim 16, wherein the processing unit is further configured to perform image processing of the image data based on Fourier transformation.

19. The apparatus according to claim 16, wherein the processing unit is further configured to perform image processing of the image data based on correlation or auto-correlation.

20. The apparatus according to claim 16, wherein the fixed reference frame is defined relative to earth.

21. The apparatus according to claim 16, wherein the processing unit is further configured to determine light intensity or wavelength of the at least one light beam based on the image data, and to derive additional data as transmitted by the at least one beacon which modulated the light intensity or wavelength.

22. The apparatus according to claim 21, wherein the non-refractive optical element is configured to receive a consecutive series of light beams transmitted from the at least one beacon and transfer the consecutive light beams to the image sensor; the image sensor is configured to form consecutive pieces of image data based on the received consecutive light beams; and the processing unit is configured to determine consecutive light intensities or wavelength of the consecutive light beams based on the consecutive pieces of image data, and to demodulate the consecutive light intensities or wavelength to derive the additional data.

23. The apparatus according to claim 21, wherein consecutive light intensities or wavelength are modulated by one of amplitude modulation, frequency modulation, and phase modulation.

24. The apparatus according to claim 16, further comprising:

a light generating system connected to the processing unit; and the processing unit configured to control the light generating system to generate and transmit at least one outgoing light beam with a modulated light intensity and/or wavelength such as to contain outgoing additional data.

25. An apparatus for communicating with at least one external beacon, the apparatus comprising:

at least one non-refractive optical element connected to a processing unit and configured as an objective to receive at least one light beam transmitted from the at least one external beacon and project the at least one light beam on an image sensor, wherein the at least one non-refractive optical element comprises a diffractive element configured to diffract the at least one light beam to form a diffracted light pattern on the image sensor;

the image sensor connected to the processing unit and to the at least one non-refractive optical element and being configured to form image data based on the at least one light beam; and the processing unit configured to communicate with a memory storing a computer program comprising instructions and data, which when executed by the processing unit, causes the processing unit to:

determine light intensity or wavelength of the at least one light beam based on the image data, and derive additional data as transmitted by the at least one beacon which modulated the light intensity or wavelength;

identify the at least one beacon within the image data based on the at least one light beam;

determine current location data of the at least one beacon based on the image data;

compare the current location data with former location data of the at least one beacon as stored in the memory; and determine whether the object has moved relative to a fixed reference frame based on the comparison.

26. The apparatus according to claim 25, wherein the at least one non-refractive optical element is configured to receive a consecutive series of light beams transmitted from the at least one external beacon and transfer the consecutive light beams to the image sensor;

the image sensor is configured to form consecutive pieces of image data based on the received consecutive light beams; and the processing unit is configured to determine consecutive light intensities and/or wavelengths of the consecutive light beams based on the consecutive pieces of image data, and to demodulate the consecutive light intensities or wavelengths to derive the additional data.

27. The apparatus according to claim 25, wherein consecutive light intensities or wavelengths are modulated by one of amplitude modulation, frequency modulation, and phase modulation.

28. A method for monitoring positions on an external object having at least one beacon attached thereto, the method comprising:

transmitting light from the at least one beacon;

projecting the light transmitted from the at least one beacon on at least one image sensor using at least one non-refractive optical element configured as objective for projecting light on the at least one image sensor, wherein the at least one non-refractive optical element comprises a diffractive element and projecting light onto the at least one image sensor comprises forming a diffracted light pattern on the at least one image sensor by the diffractive element;

processing image data formed by the at least one image sensor to filter image data components relating to background light and render image data components relating to at least one light beam;

identifying the at least one beacon within the image data based on the at least one light beam;

determining current location data of the at least one beacon based on the image data;

comparing the current location data with former location data of the at least one beacon as stored in memory; and
determining whether the object has moved relative to a fixed reference frame based on the comparison.

29. The method according to claim 28, further comprising:
determining angular positions of the at least one beacon by reconstructing an optical pathway between the non-refractive optical element and the image sensor in dependence of the angular positions of the at least one beacon in respect of the non-refractive optical element by using an iterative algorithm.

30. The method according to claim 28, wherein random noise or noise having a pre-determined pattern is added to each pixel of the image data before digitization.

31. The method according to claim 28, further comprising:
calibrating non-linearity of each pixel of the image data; and compensating the image data to make the image data linear in the image processing.

* * * * *